United States Patent [19]
Hata

[11] Patent Number: 5,712,847
[45] Date of Patent: Jan. 27, 1998

[54] LINE SWITCHING SYSTEM FOR DUPLEXED FIBER INTERFACE SHELF BETWEEN DIFFERENT MODES

[75] Inventor: Emi Hata, Kawasaki, Japan

[73] Assignee: Fujitsu Limited, Kanagawa, Japan

[21] Appl. No.: 572,765

[22] Filed: Dec. 14, 1995

[30] Foreign Application Priority Data

Apr. 18, 1995 [JP] Japan .................................. 7-092072

[51] Int. Cl.⁶ .................................................. H04L 1/22
[52] U.S. Cl. ........................ 370/228; 370/410; 371/68.2
[58] Field of Search ........................... 340/825.01; 455/8; 371/68.1, 68.2; 375/260; 370/217, 225, 228, 395, 396, 410, 524, 535

[56] References Cited

U.S. PATENT DOCUMENTS

| | | | |
|---|---|---|---|
| 4,967,406 | 10/1990 | Yagi et al. | 370/228 |
| 5,069,521 | 12/1991 | Hardwick | 370/228 |
| 5,220,563 | 6/1993 | Grenot et al. | 370/410 |
| 5,479,396 | 12/1995 | Kusano | 370/217 |

OTHER PUBLICATIONS

"Synchronous Optical Network (SONET) Transport Systems: Common Generic Criteria" (Incremental Proposed Requirements to TR–NWT–000253, Issure 2).

Primary Examiner—Benedict V. Safourek
Attorney, Agent, or Firm—Helfgott & Karas, P.C.

[57] ABSTRACT

Switches connected via transmission lines, wherein one switch has a bidirectional mode, while the other switch has a unidirectional mode. To realize line switching when a failure occurs, the switches function to switch signals from a working transmission line to a protection transmission line. The switch having the bidirectional mode switches concurrently both first and second direction paths from a working transmission line to a protection transmission line. The switch having the unidirectional mode switches either one of the first and second direction paths from the working transmission line to the protection path. When the second switch switches to send signals via the first direction path of the protection transmission, the first switch notifies the second switch as if a fault occurred in the second direction path of the working transmission line.

15 Claims, 24 Drawing Sheets

FIG. 10

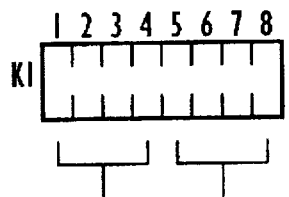

— BIT 1-4 : REQUEST TYPE

| REQUEST TYPE | DETAILED EXPLANATION | CODE |
|---|---|---|
| FAULT DETERIORATION | SF<br>SD | 1100<br>1010 |
| APS CONTROL STATE | DO NOT REVERT | 0001 |
| EXTERNAL REQUEST | LOCKOUT OF PROTECTION<br>FORCED SWITCH<br>MANUAL SWITCH<br>EXERCISE (NOT SUPPORTED) | 1111<br>1110<br>1000<br>0100 |

— BIT 5-8 : CHANNEL

| MEANING | USE OR THE LIKE | CODE |
|---|---|---|
| NULL | P-LINE, SF, SD<br>LOOKOUT OF PROTECTION | 0 |
| WORKING CHANNEL | W-LINE<br>(IT BECOMES ONLY 1<br>  IN 1+1 SYSTEM) | 1-14 |
| EXTRA TRAFFIC | NOT USED IN 1+1 SYSTEM | 15 |

BIT 1-4 : CHANNEL

IF CH No. OF THE RECEIVED K1 BYTE IS NULL,
INSERT "NULL", WHEREAS INSERT CH No. OF CHANNEL,
WHICH IS BRIDGES TO P-LINE.
CODE IS THE SAME AS CH No. OF K1 BYTE.

BIT 5 : ARCHITECTURE

| ARCHITECTURE | CODE |
|---|---|
| 1 + 1 | 0 |
| 1 : n | 1 |

BIT 6-8 : OPERATION

| OPERATION | CODE |
|---|---|
| BIDIRECTION | 101 |
| UNIDIRECTION | 100 |

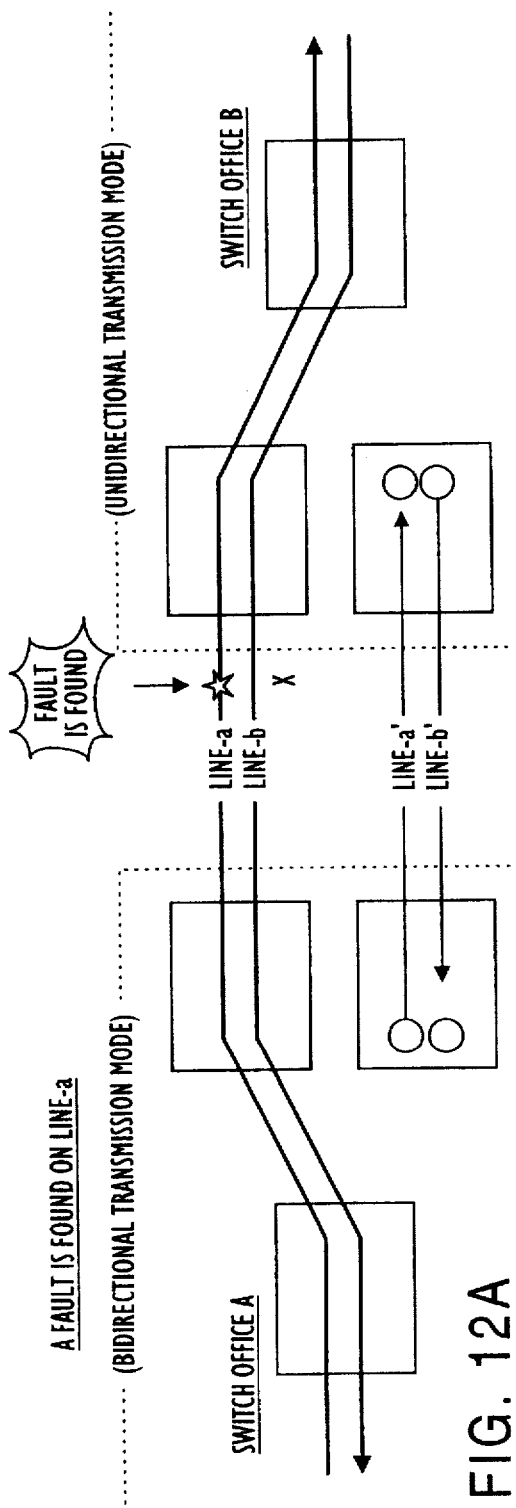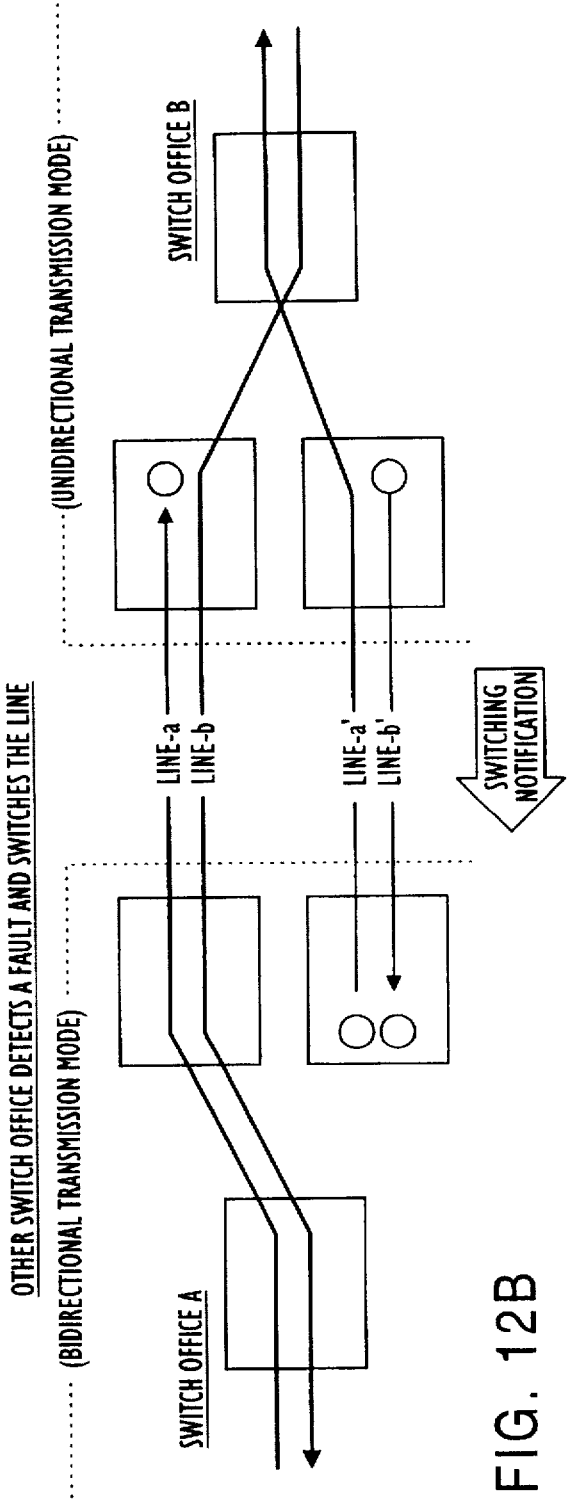

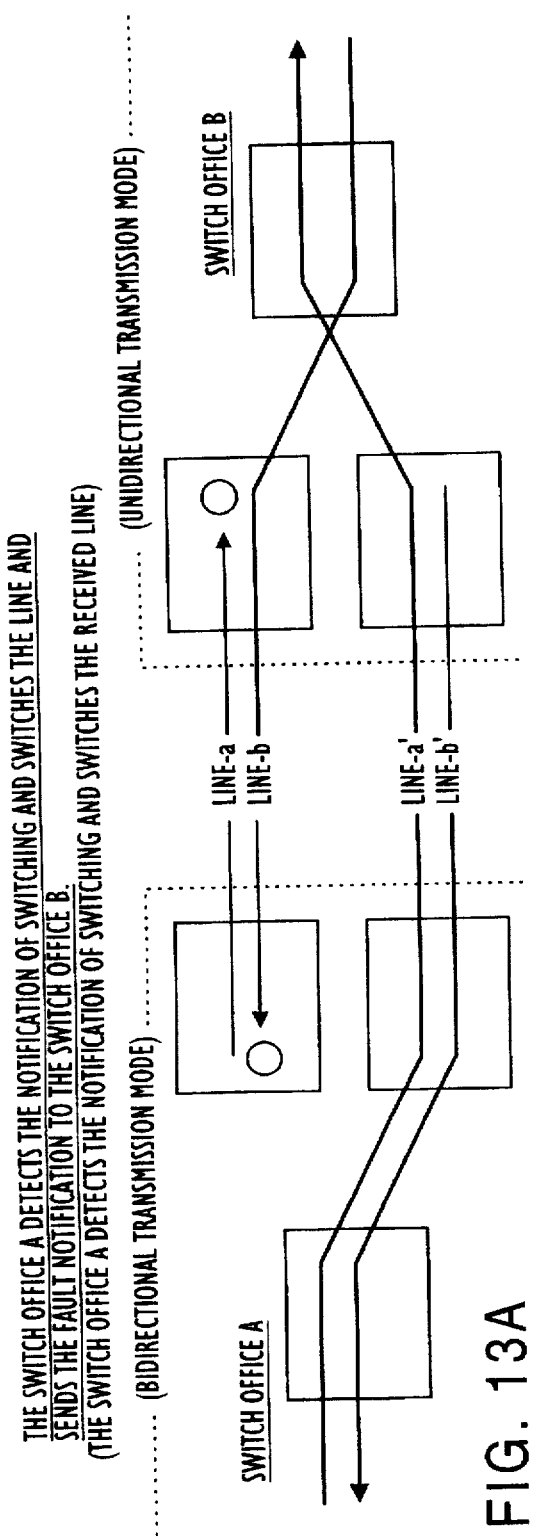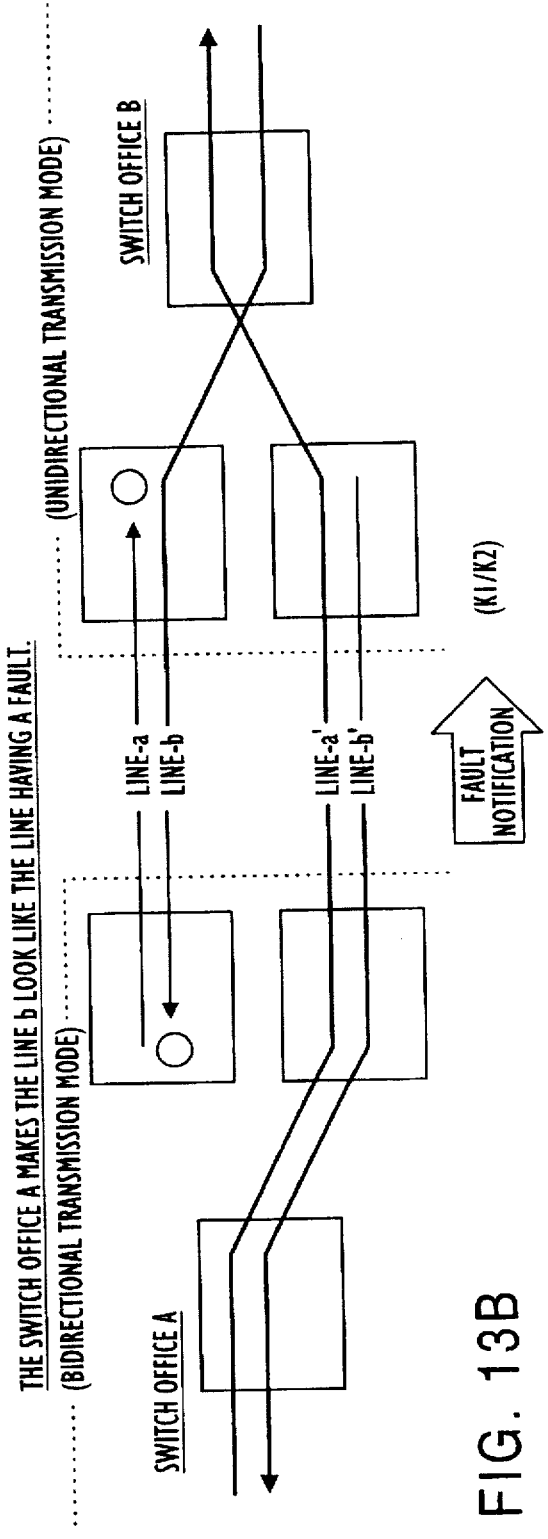

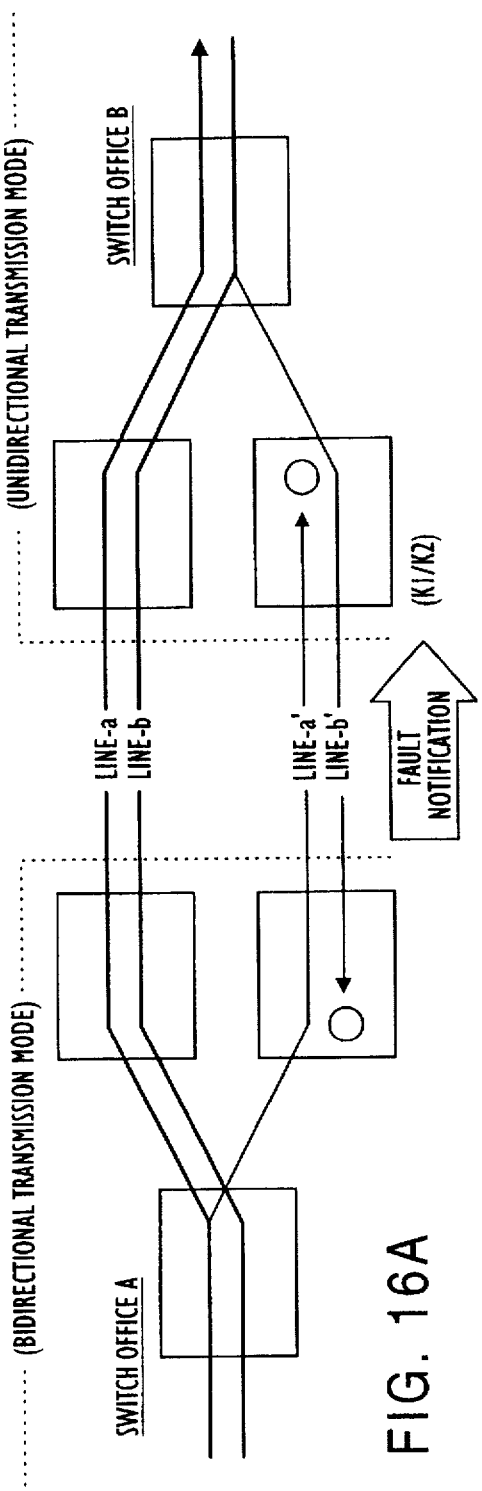
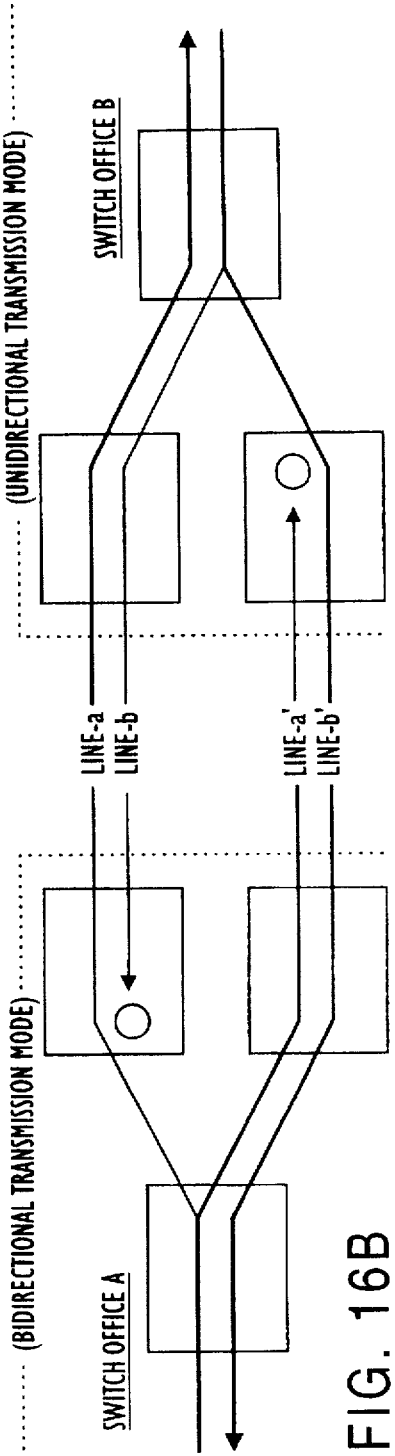
FIG. 16A
FIG. 16B

LINE SWITCHING SYSTEM FOR DUPLEXED FIBER INTERFACE SHELF BETWEEN DIFFERENT MODES

BACKGROUND OF THE INVENTION

1. Field of the Invention

The present invention relates to a line switching system for a duplexed fiber interface shelf, and more particularly to a line switching system, which can overcome drawbacks presented in the case where a bidirectional transmission mode and a unidirectional transmission mode of line switching are employed in a system and switching operation is executed between the both switch offices respectively having the bidirectional and unidirectional transmission modes.

2. Description of the Related Art

In a B-ISDN, which means a broadband-ISDN, a service function has be realized for switching a working line to a protection line to provide protection from failure that likely occurs during communication or data transmission.

In the B-ISDN that serves the above-described service function, the UNI (User Network Interface) and the NNI (Network Node Interface) prescribe a high-speed interface formed mainly in the SONET (Synchronous Node Optical Network) or the SDH (Synchronous Digital Hierarchy).

Network highways should have redundancy structures as prescribed in the high-speed interface, and the APS (Automatic Protection Switching), which is prescribed in the SONET or the SDH, is currently employed. The function of the APS is further described as follows in accompanied with drawings.

FIG. 18 shows a principle structure of the B-ISDN system. The system is formed of ATM switches 1, each of which has a function of ATM, i.e., Asynchronous Transfer Mode switching, and a concentrator 2 for concentrating subscriber lines. Referring now to FIG. 19, a principle structure of an ATM switch 1 is shown. Shown is the ATM switch 1 comprising duplexed ATM switch modules 10 for switching transmission paths of ATM cells, a fiber interface shelf 20 having duplexed fiber interface common cards 11 for controlling network highways, duplexed fiber interface cards 14, duplexed subscriber line controllers 12 for controlling subscriber lines, duplexed internal control signal processors 15 for processing internal control signals, and an operation system 16 for controlling an internal office.

Fiber interface cards 13 and 14 are constructed according to an interface with each of the network highways. Each of the above-described sections forming the ATM switch 1, except the operation system 16, has a duplexed redundancy structure.

Referring to FIG. 20, a structure of a fiber interface shelf is shown. The fiber interface shelf 20 is formed of duplexed fiber interface cards 14 and duplexed fiber interface common cards 11. The fiber interface cards terminate duplexed, lines 17, and are constructed individually, according to an interface with each of the network highways, so called as an individual section.

The duplexed fiber interface common cards 11 have interfaces with the duplexed ATM switch modules 10. Further, the duplexed fiber interface common cards 11 control highways in common, which are known generally as common sections. Hereinafter, the fiber interface common card and the fiber interface card are referred as individual and common sections 14 and 11, respectively.

FIG. 21 shows a structural example for connecting one switch office to the other switch office. In FIG. 21, a section A is a fiber interface shelf of the one switch office, and a faced section B is a fiber interface shelf of the other switch office. Each of the sections A and B includes a common section 11 and duplexed individual sections 140 and 141, each of which is a fiber interface card provided corresponding to 0 or 1 group.

In this example, the APS controls the line switching of 0/1 group individual sections 140, 141 with the use of its common section 11. The example shown in FIG. 21 shows the line connection of 1+1 structure. The APS architecture has 1+1 structure, in which one protection line P is provided for one working line W, as shown in FIG. 21.

Additionally, the APS architecture may have 1:n structure. In the 1:n structure, one protection line is provided for n working lines. In the 1+1 structure shown in FIG. 21, a signal flows to both the working and protection lines W and P, and the common section 11, which is the received side, receives a signal from the switched and selected line of the working and protection lines W and P.

The above-described line switching will be explained in accompanying with FIGS. 22 and 23. FIG. 22 is an explanatory diagram of line switching with the 1+1 structure, and FIG. 23 is an explanatory diagram of line switching with the 1:n structure. In the 1+1 structure shown in FIG. 22, upward signals are commonly sent to working and protection lines, while the selector S switches and connects downward signals to the working line, of the other fiber interface shelf. Meanwhile, in the 1+n structure shown in FIG. 23, null channel is provided as a protection line, and working lines 1 to n are provided for the channels 1 to n. For a working line, which is fault, of the working lines 1 to n, the null channel is substituted for the fault working line by the line switching of the bridge side B and the selector side S.

The APS architecture has a bidirectional transmission mode and a unidirectional transmission mode as category, other than the above-described two structures. In the bidirectional transmission mode, even if a fault is detected on only one directional line, both directional lines, i.e., X and Y directions shown in FIG. 21, are switched. As shown in FIG. 21, the working upward and downward lines a and b are concurrently switched to the protection upward and downward lines a' and b', when fault is detected on the working line a or b.

In the unidirectional transmission mode, only one line, on which fault is detected, is switched. For example, only the line a of the working lines W, on which a fault is detected, is switched to the line a' of the protection lines P, but the line b of the working lines W is not changed.

In the 1+1 structure, the unidirectional transmission mode is normally set as a default, and the operation of the bidirectional transmission mode is option. However, it is not easy to switch on one directional line, regarding to hardware structure or administration of system condition. Therefore, it becomes necessary to provide in bidirectional transmission mode.

Further, FIG. 24 is an explanatory diagram of bidirectional transmission mode. In FIG. 24, the section A is a fiber interface shelf of one switch office, and the section B is a fiber interface shelf of the other switch office, as the same as those shown in FIG. 21. When the line b is switched to the line b' due to a fault on X point of the individual section 140 in the fiber interface shelf B on the unidirectional transmission mode, only one directional line b is switched, but the line a is not changed. FIG. 24 shows that condition.

Therefore, when maintaining the individual section 140 in the section B, the line a cannot be maintained while used.

Accordingly it is required to provide the lines on the bidirectional transmission mode to solve the inconvenience.

As described above, the unidirectional transmission mode is employed as a default value in the 1+1 structure. Therefore, while other station is in operating, the system cannot cope with the fault.

SUMMARY OF THE INVENTION

Accordingly, it is an object of the present invention to provide a line switching system for a duplexed fiber interface shelf between switch offices of different modes, i.e., bidirectional and unidirectional transmission modes, to overcome the drawbacks of the prior art.

It is another object of the present invention to provide a line switching system, which can switch both directional lines, and perform the same processing as the bidirectional transmission mode for a switch office of the unidirectional transmission mode, even if a first switch office employs the bidirectional transmission mode and a second switch office employs the unidirectional transmission mode, and only a switching for one directional line is performed due to a fault detected in the one directional line.

A line switching system for switching a working line on which a fault is found to a protection line of duplexed transmission lines connecting with a faced switch office, the line switching system comprising: a first switch office having a bidirectional transmission mode; and a second switch office connected to the first switch office having a unidirectional transmission mode via the duplexed transmission lines, the first switch office notifying a fault detected on a working transmission line, which is toward the second switch office, of the duplexed transmission lines, to the second switch.

BRIEF DESCRIPTION OF THE DRAWINGS

FIG. 10 is a diagram for explaining the definition of the K1 byte.

FIGS. 12A and 12B show a first embodiment of line switching with a 1:n structure.

FIGS. 13A and 13B show a second embodiment of line switching with a 1:n structure.

FIG. 16 illustrates a second embodiment of line switching with a 1+1 structure.

DESCRIPTION OF THE PREFERRED EMBODIMENTS

Figure 1:
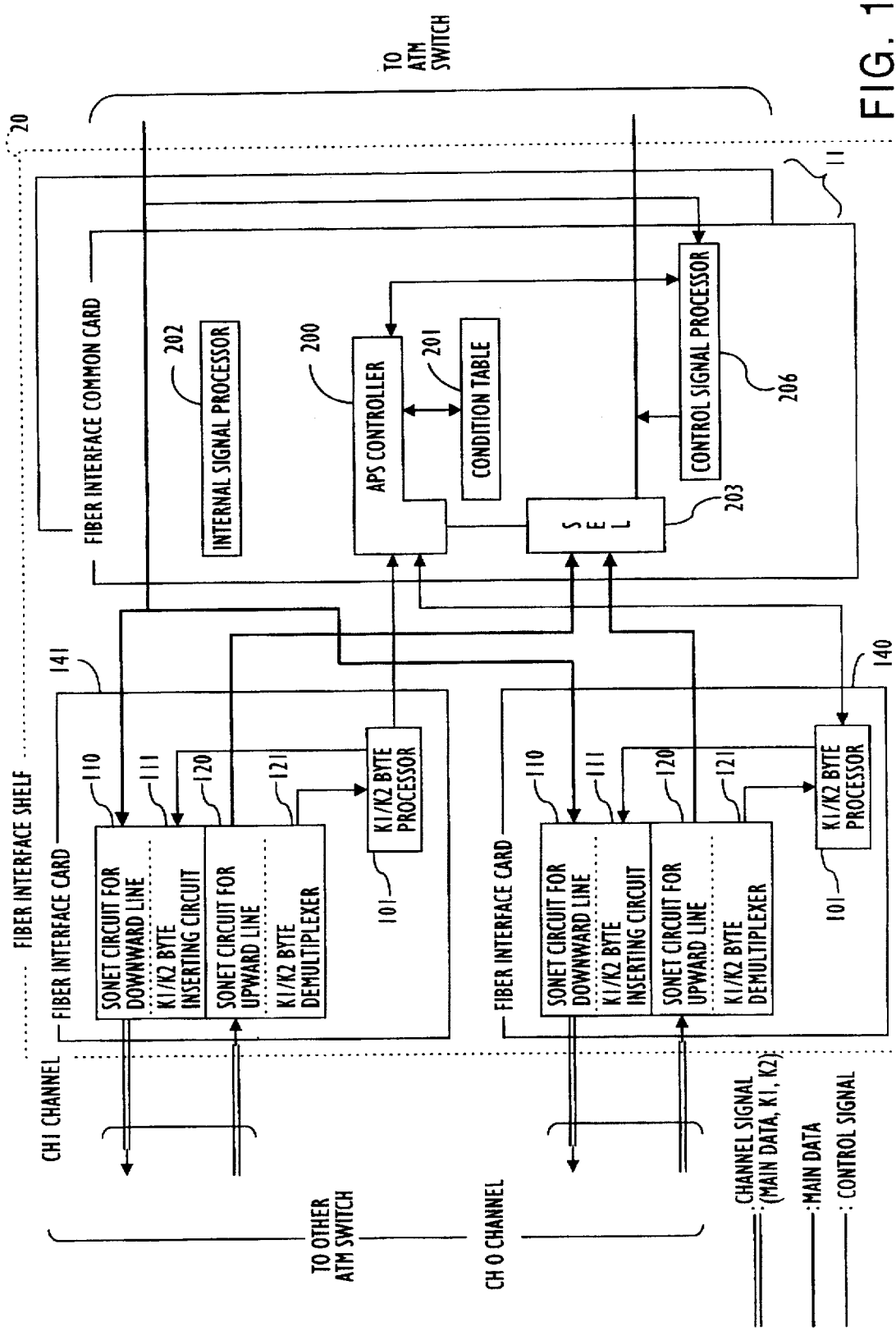
FIG. 1 is a structural block diagram of a fiber interface shelf according to the present invention.

Hereinafter, embodiments according to the present invention will be explained in accompanying with drawings. Throughout the following descriptions, the same reference numeral are used to denote and identify corresponding or identical components.

FIG. 1 is a structural diagram of a fiber interface shelf according to the present invention. More particularly, it shows a control structure of an APS function of the fiber interface shelf 20 in a B-ISDN system. In this example, the APS function means a system which self-controls the line switching, without the control of an operation system, in concurrent with detecting line faults.

Since the fiber interface shelf 20 employs the system which self-controls the line switching, it is not required to take long time from detecting faults to completing switching. More particularly, it is one of the requirements in the above-described SONET/SDH to complete the switching within 50 ms. The APS system also defines a switching function with the use of commands sent from the operation system.

The faults and command switching factors are divided into a plurality of ranks of priorities. Further, switching procedure is performed by employing K1/K2 bytes in an overhead section of the SONET frame architecture, and transmitting and receiving a protocol with an other connected switch.

In FIG. 1, the fiber interface cards 140, 141 as individual sections, which terminate 0/1 group lines, have the same structure. Each of the fiber interface cards 140 and 141 is connected to the other switches via 0 or 1 group line.

Each of the fiber interface cards 140 and 141 has a SONET processor comprising a SONET circuit for the upward line 110 and a SONET circuit for the downward line 120. The fiber interface cards 140 and 141 further have a K1/K2 byte inserting circuit 111 and a K1/K2 byte demultiplexer 121, each of which corresponds to the SONET processing circuit 110/120. In FIG. 1, an arrow shown with a bold line shows a flowing of a main signal.

The main signal sent from the common section 11 is inputted to the SONET circuit for downward line 110 in the SONET processor. The K1/K2 byte inserting circuit 111 inserts the K1/K2 bytes to the main signal, and sends the inserted main signal to the other ATM switch. Additionally, the K1/K2 bytes are sent through a protection line to the other ATM switch. Meanwhile, the main signal sent from the other ATM switch to the common sections 11 is passed through the SONET circuit for the upward line 120 in the SONET processor, and is outputted toward the working and protecting common sections 11. Further, the K1/K2 demultiplexor 121 demultiplexes K1/K2 bytes and inputs them to a K1/K2 byte processor 101.

A fault monitoring signal, which is sent from a fault monitor, not shown in FIG. 1, is inputted to the K1/K2 byte processor 101. Accordingly, the K1/K2 byte processor 101 reflects the result of fault monitoring to the content of K1/K2 bytes due to the K1/K2 byte definition, which is later described.

An internal control signal processor, which sends an internal control signal, not shown in FIG. 1, sends the K1/K2 bytes sent from the K1/K2 byte processor 101 to the common section 11, as an internal control signal including K1/K2 bytes.

On the other hand, the fiber interface common card 11, which is a common section shown in FIG. 1, has a selector 203, which selects, switches and outputs an active signal from the main signals sent from the working and protecting individual sections, that is, the fiber interface cards 140 and 141. The main signal selected by the selector 203 is inputted to a multiplexer, not shown in FIG. 1. Then, the multiplexer multiplexes and inserts the internal control signal, which is sent from the control signal processor 206 to the main signal, and sends it to the ATM switch 2.

The APS controller 200 controls switching of the selector 203, based on data in the condition table 201, fault monitoring data sent from the fault monitor, an APS command or message, which is an output of the internal control signal processor 206 for processing the internal control signal demultiplexed by the demultiplexor, and further, a control signal including K1/K2 bytes sent from the individual sections 140 and 141.

The demultiplexor, not shown in FIG. 1, multiplexes and inputs the internal control signal, which is piled with the main signal sent from internal control signal processor 15 via the ATM switch 10.

The control signal including K1/K2 byte will be explained with the use of the SONET frame structure as follows.

Figure 2:
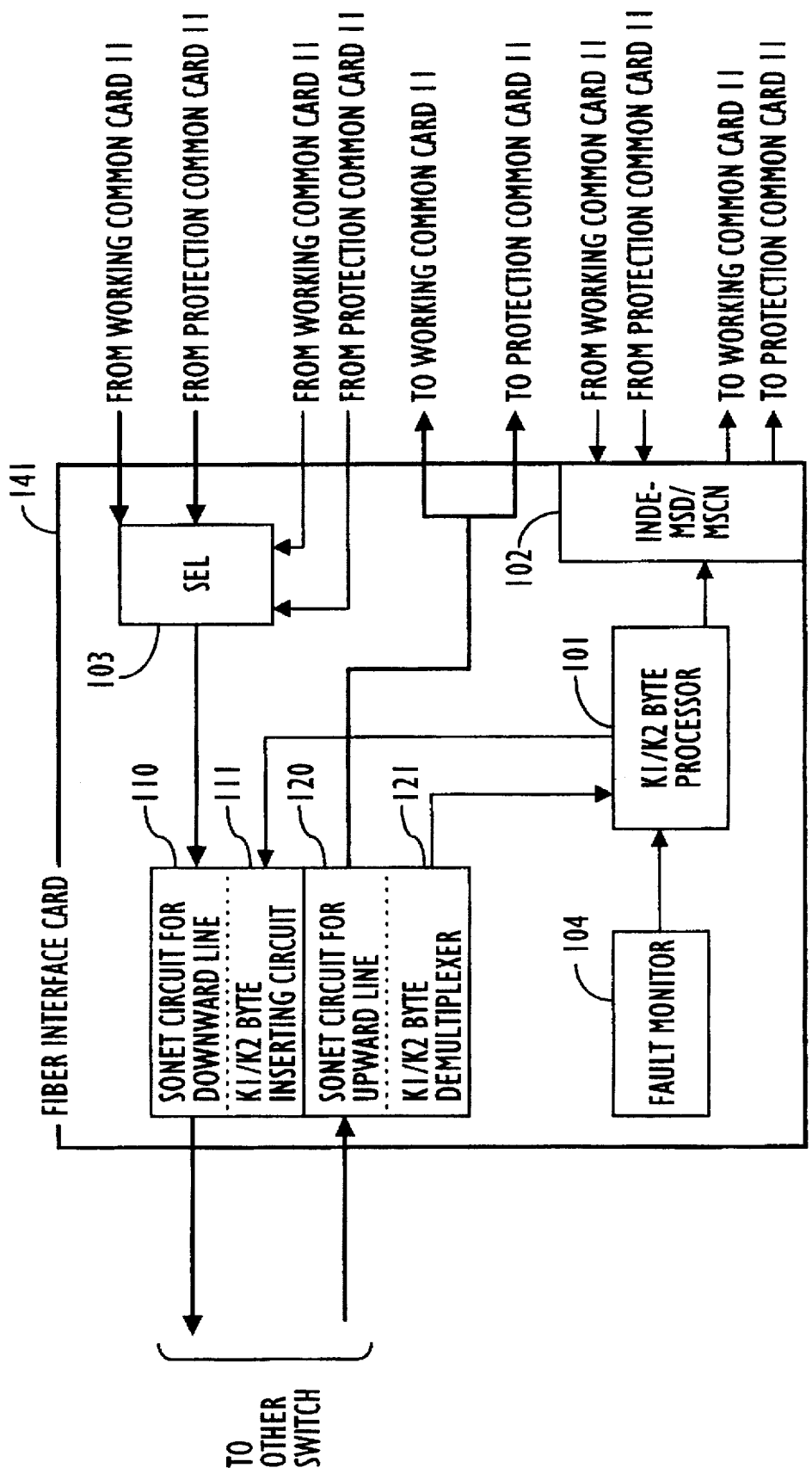
FIG. 2 is a block diagram showing a structural example of the fiber interface card shown in FIG. 1.

FIG. 2 is a block diagram showing a structural example including a flow of the main signal of the working fiber interface card 141 in the fiber interface shelf 20 shown in FIG. 1. As described above, the protection fiber interface card 140 has the same structure.

The fiber interface card 141, i.e., an individual section, includes a SONET processor shown in FIG. 1 having a SONET circuit 110 for a downward line and a SONET circuit 120 for a upward line. Further, the SONET circuits 110 and 120 have a K1/K2 byte inserting circuit 111 and a K1/K2 byte demultiplexor 121, respectively.

A selector 103, which is not shown in FIG. 1, controls the switching to input the main signal sent from the fiber interface common cards, i.e., the working and protection group common sections, and to output the main signal sent from the fiber interface common card, i.e., the common section, which is ACT (active). Further, the main signal is inputted to the SONET circuit 110 for the downward line in the SONET processor. The K1/K2 byte inserting circuit 111 inserts K1/K2 byte to the main signal and send them to the other switch. In this case, the K1/K2 bytes are also sent via the protection line.

The main signal sent from the other switch is commonly outputted to the common sections 11, of ACT and STB groups, via the SONET circuit 120 for the upward line in the SONET processor.

Further, the K1/K2 demultiplexor 121 demultiplexes K1/K2 bytes from the main signal, and inputs demultiplexed K1/K2 bytes to the K1/K2 byte processor 101. A fault monitoring signal sent from the fault monitor 104, which is not shown in FIG. 1, is inputted to the K1/K2 byte processor 101. Accordingly, the K1/K2 byte processor 101 reflects the result of monitoring fault with the content of K1/K2 bytes, according to a definition of K1/K2 bytes, of which definition is later discussed.

An internal control signal transmitter (INDE-MSD/MSCN) 102, not shown in FIG. 1, selects an internal control signal including K1/K2 bytes sent from the active one of the common sections 11. Further, the transmitter 102 sends an internal control signal including K1/K2 bytes to the common sections 11.

Figure 3:
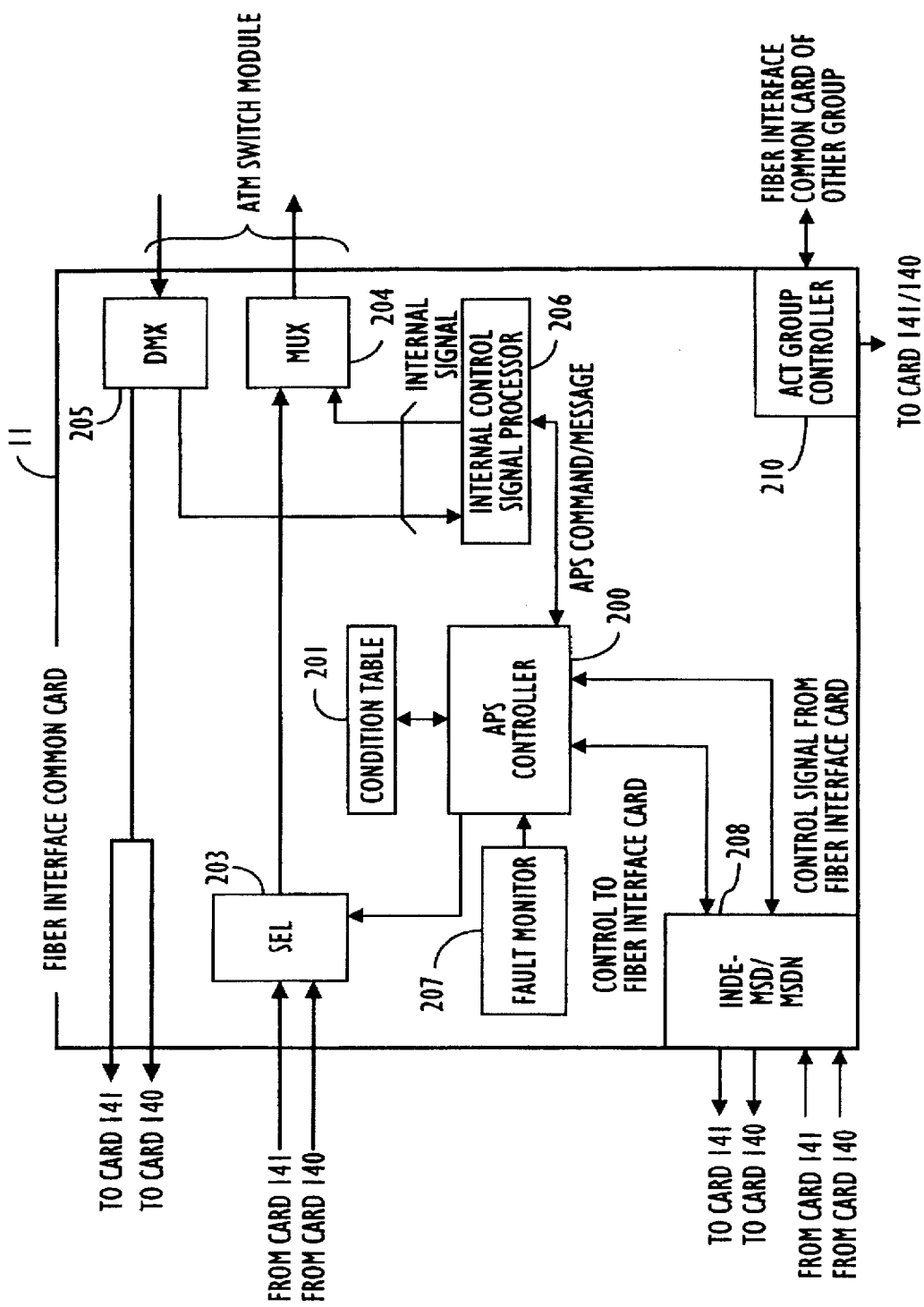
FIG. 3 is a block diagram showing a structural example of the fiber interface common card shown in FIG. 1.

FIG. 3 is a block diagram showing a structural example of the common sections 11 shown in FIG. 1. In FIG. 3, a demultiplexer 205 selects and extracts an internal control signal from the signals sent from the ATM switch module 10.

A selector 203 switches and outputs one main signal, which is for the ACT (active) group, selected from the main signals sent from the working and protection individual sections 141 and 140. The main signal selected in the selector 203 is inputted to a multiplexer 204. Then, the internal control signal is multi-inserted to the main signal and is sent out to the ATM switch module 10.

An APS controller 200 controls switching of the selector 203, based on data in the condition table memory 201, fault monitoring data sent from the fault monitor 207 for various devices, an APS command/message, which is an output of the internal control signal processor 206 which processes the internal control signal demultiplexed by the demultiplexer 205, and a control signal including K1/K2 byte sent from the individual sections 141 and 140, and the APS controller 200 further stores the updated data in the condition table 201.

The internal control signal transmitter (INDE-MSD/MSCN) 208 is corresponding to the internal control signal transmitter 102 in the individual section 141 shown in FIG. 2. The transmitter 208 sends an APS control signal to the working and protection individual sections 141 and 140, and receives the control signals sent from the individual sections 141 and 140. An ACT controller 202 controls the selector 103 in the individual sections 141 and 140 to switch to the ACT (active) side, by synchronizing with a fiber interface common card of the SBY (standby) side, which is the protection common section 11 in the case shown in FIG. 3.

Figure 4:
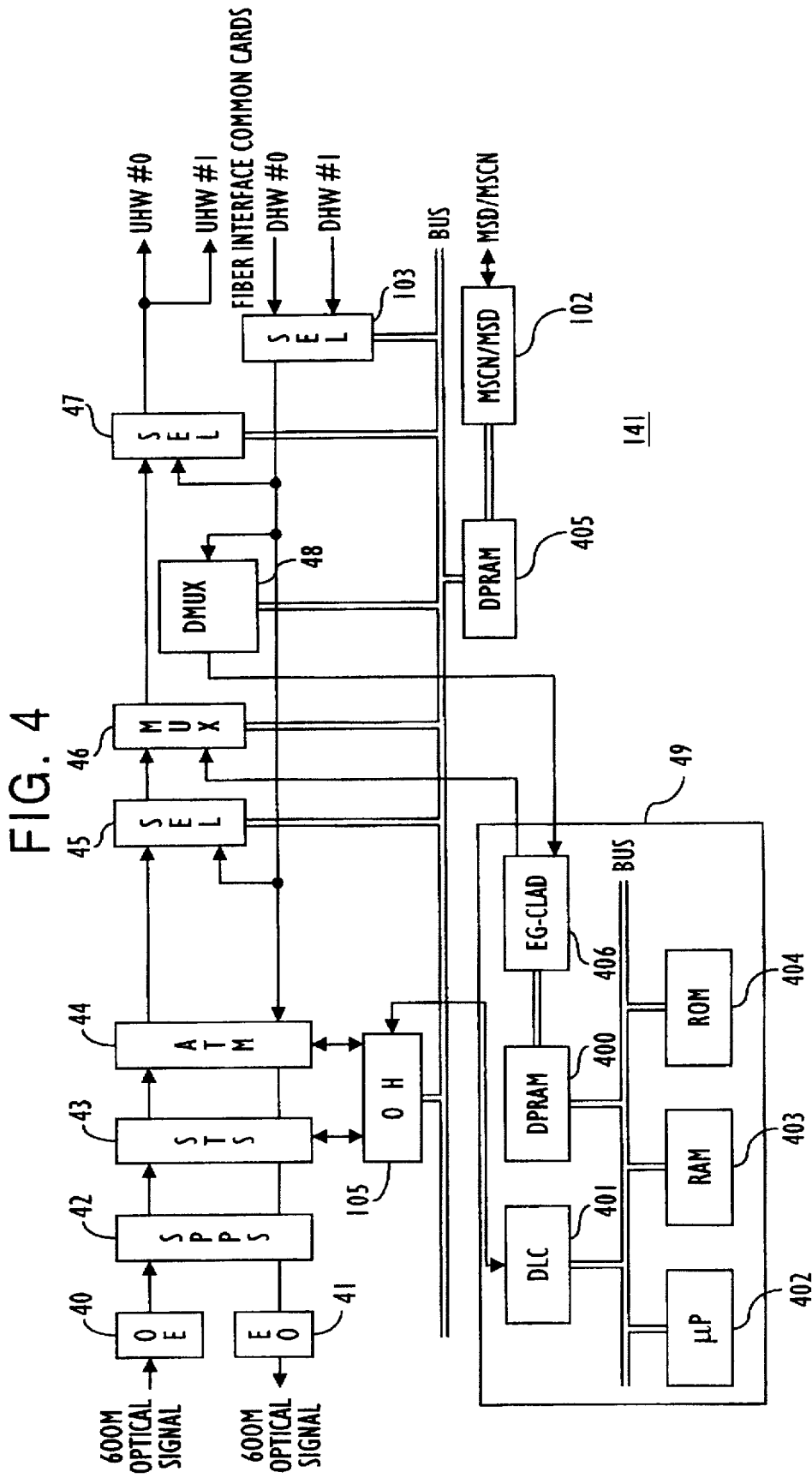
FIG. 4 is a block diagram showing a detailed structural example of the fiber interface card.

FIG. 4 is a block diagram showing the detailed structural example of the individual section 141 of the working group. At first, a flowing in the upward direction toward the common section from the individual section will be explained in FIG. 4. Reference numerals 40 and 41 are an optical/electrical converter and an electrical/optical converter, respectively.

The optical/electrical convertor 40 converts an inputted optical signal of 600 Mbps sent from a line linked to the other switches to an electrical signal. Then, a serial/parallel or a parallel/serial convertor 42 converts the converted electrical signal to a parallel signal.

Then, the converted parallel signal is inputted to the SONET processor 43 to control the SONET frame synchronization. The frame signal performed the frame synchronization is inputted to the ATM cell processor 44. The SONET processor 43 inputs the frame signal performed the frame synchronization to the ATM cell processor 44, and branches K1/K2 bytes positioned on the overhead section based on a control signal from the overhead section controller 105.

A selector 45 turns the flowing of a test signal. The selector 45 returns the test signal flowing in a downward direction toward the individual section, sent from the common section, back to the common section.

The multiplexer 46 multiplexes the internal control signal sent from the internal control signal processor (EG-CLAD) 206 with the main signal sent from the ATM cell processor 44. Further, the selector 47 returns the test signal flowing in the downward direction as well as the selector 45. The selectors 45 and 47 are controlled to output the main signals in a normal state.

In this way, the provision of the plurality of selectors makes easy to specify faults, by returning back the test signal on each selector. The output of selector 47 is commonly inputted to the working and protection common sections 11.

In FIG. 4, a main signal in the downward direction sent from the working and protection common sections 11 is inputted to the selector 103. The signal sent from the common section of the ACT (active) group is selected from the main signals and is outputted to the demultiplexer 48. The signal from the common section of the ACT (active) group is also inputted to the ATM cell processor 44.

The ATM cell processor 44 inserts K1/K2 bytes to the overhead section of the SONET frame, under the control of the overhead section controller 105. Further, the output from the ATM cell processor 44 is performed the frame synchronization in the SONET processor 43. Then, the signal is converted to the serial signal in the serial/parallel or parallel/serial converter 42.

The converted serial signal is further converted to an optical signal in the electrical/optical converter 41, and is sent out to the other switch as an optical signal of 600 Mbps.

Further, in FIG. 4, the internal control signal processor 49 has a data link control circuit (DLC) 401, which has an interface function of the control signal with the overhead controller 105 operated under the control of a micro processor 402, a work RAM 403 for the micro processor 402, and a ROM 404 for storing a control program. Further, in the processor 49, an internal control signal processor (EG-CLAD) 406 connected via a dual port RAM 400 is provided.

In this embodiment, the internal control signal processor (EG-CLAD) 406, which is connected to a multiplexer 46 and a demultiplexor 48, transmits control signals for totally controlling the internal devices including the ATM switch modules 10.

Further, the internal control signal transmitter 102 is connected to the internal control signal transmitter 208 in the common sections 11, and is connected to a bus (BUS) via a dual port RAM 405. Further, the internal control signal transmitter 102, as described above, has a selector. The selector of the transmitter 102 selects and receives the signal sent from the active common section, which is selected from the APS control signals sent from the active and standby common sections 11.

Furthermore, the selecting operation of the above-described selector 103 in FIG. 2 is performed according to the APS control signal outputted from the internal control signal transmitter 102.

Figure 5:
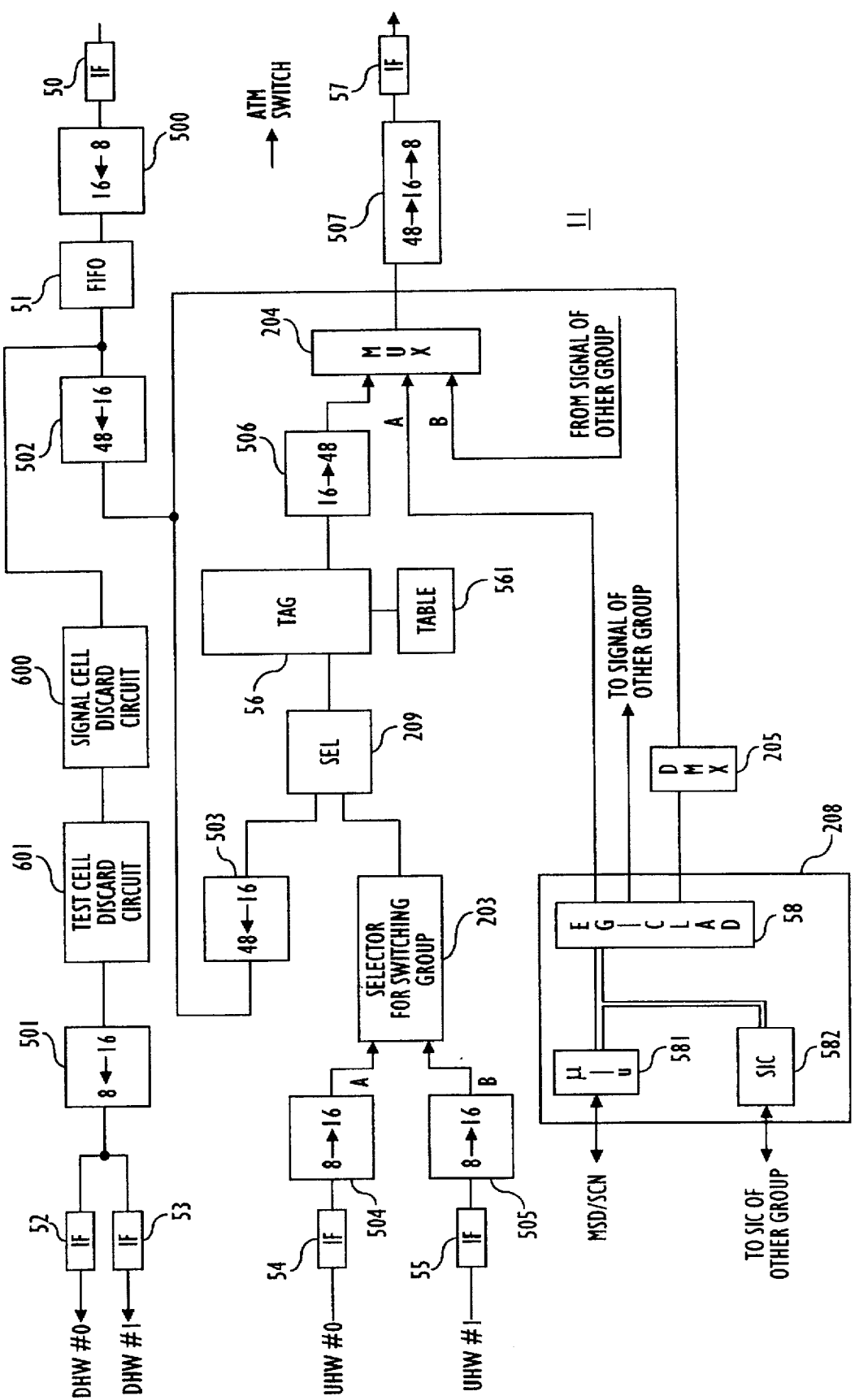
FIG. 5 is a block diagram showing a detailed structural example of the fiber interface common card.

FIG. 5 is a block diagram showing a detailed structural example of the common sections 11. A main signal in the downward direction sent from the ATM switch module 10 is inputted to an interface circuit 50. Then, a clock converter 500 converts the 8-bits signal to 16-bits signal. That is, bit number of data buses is converted by converting a clock frequency of the signal.

Further, 16-bit signal sequence is inputted to a FIFO memory 51, and is outputted after buffering. The FIFO memory 1, which has a function of a clock converting buffer memory, converts an input signal clock to a system clock.

A signal cell discard circuit 600 discards the internal control cell from the output of FIFO memory 51, not to flow the cell to the individual sections 11. Further, a test cell discard circuit 601 similarly discards the test cell for the loop back testing.

The main signal, from which a signal cell and a test cell are removed, is converted to a 8-bit signal in a clock converter 501, again. Then, the converted signal is inputted to a selector 103 in the working and protection individual sections 141 and 140, via interface circuits 52 and 53.

The output of the FIFO memory 51 is branched and inputted to a clock converter 502. Then, the signal is converted to 48-bit signal. If the 48-bit signal is a test cell for loop back testing, the signal is inputted to the clock convertor 503, returned to 16-bits signal sequence there, and inputted to the selector 209. The selector 209 switches the test cell for looping back sent from the clock convertor 503 to the main signal in the upward direction, which is later discussed, and returns the test cell to the ATM module 10 (looping back).

Further, the demultiplexer 205 extracts an internal control cell from the output of the clock converter 502. Then, the internal control cell is inputted to an EG-CLAD circuit 58 composing one section of the internal control signal transmitter 208. The EG-CLAD circuit 58 resolves and reconstructs the internal control cell. The micro processor 581 is connected to the EG-CLAD circuit 58 via a bus.

More particularly, the micro processor 581 is connected to the internal control signal transmitter 102 in the individual sections 141 and 140. Then, the EG-CLAD circuit 58 sends a control signal to control the switching in the selector 103 of the individual sections 141 and 140, described above, based on the internal control cell for which resolving and reconstruction is performed.

A serial interface control circuit (SIC) 582 has a serial interface function for controlling communication with SIC in the other group.

Referring now to FIG. 5, the main signal in the upward direction sent from the selector 47 in the individual sections 141 and 140 are inputted to the clock convertors 504 and 505, via the interface circuits 54 and 55 of working and protection groups. The clock convertors 504 and 505 convert 8-bits main signals to 16-bits signals.

The outputs from the clock convertors 504 and 505 are inputted to the group switching selector 203. Then, the output of the selected one of the clock convertors 504 and 505 is outputted from the group switching selector 209 to switch the group of the individual section.

The output of the selector 203 is inputted to the selector 209 and is switched from the signal for looping back testing, described above. The output of the selector 209 is inputted to a TAG allocation circuit 56 to perform TAG allocation. That is, a TAG value which specifies a routing paths for switching in the ATM switch is found by retrieving the table 561 from the values of VPI (Vertical Path Identifier) and VCI (Vertical Channel Identifier) included in the main signal. Then, the found TAG value is allocated to the cell in the frame.

The output of the TAG allocation circuit 56 is further converted to the 48-bits signal of a higher-speed clock in the clock convertor 506. Then, a main signal from the clock convertor 506, a signal A outputted from the EG-CLAD circuit 58 and a signal B outputted from the EG-CLAD circuit 58 of other group are inputted to the multiplexer 204.

The multiplexer 204 multiplexes the main signal from the clock convertor 506 with one selected from the signals A and B outputted from the above-described EG-CLAD circuit 58 to switch the groups of the individual sections, and the selected one belongs to the group which takes into the cells of the main signal.

The signal A or B, which is multiplexed with the main signal in the multiplexer 204, is converted from 48-bits to 8-bits in the clock convertor 507, and is sent to the ATM switch side, via an interface circuit 57.

Figure 6:
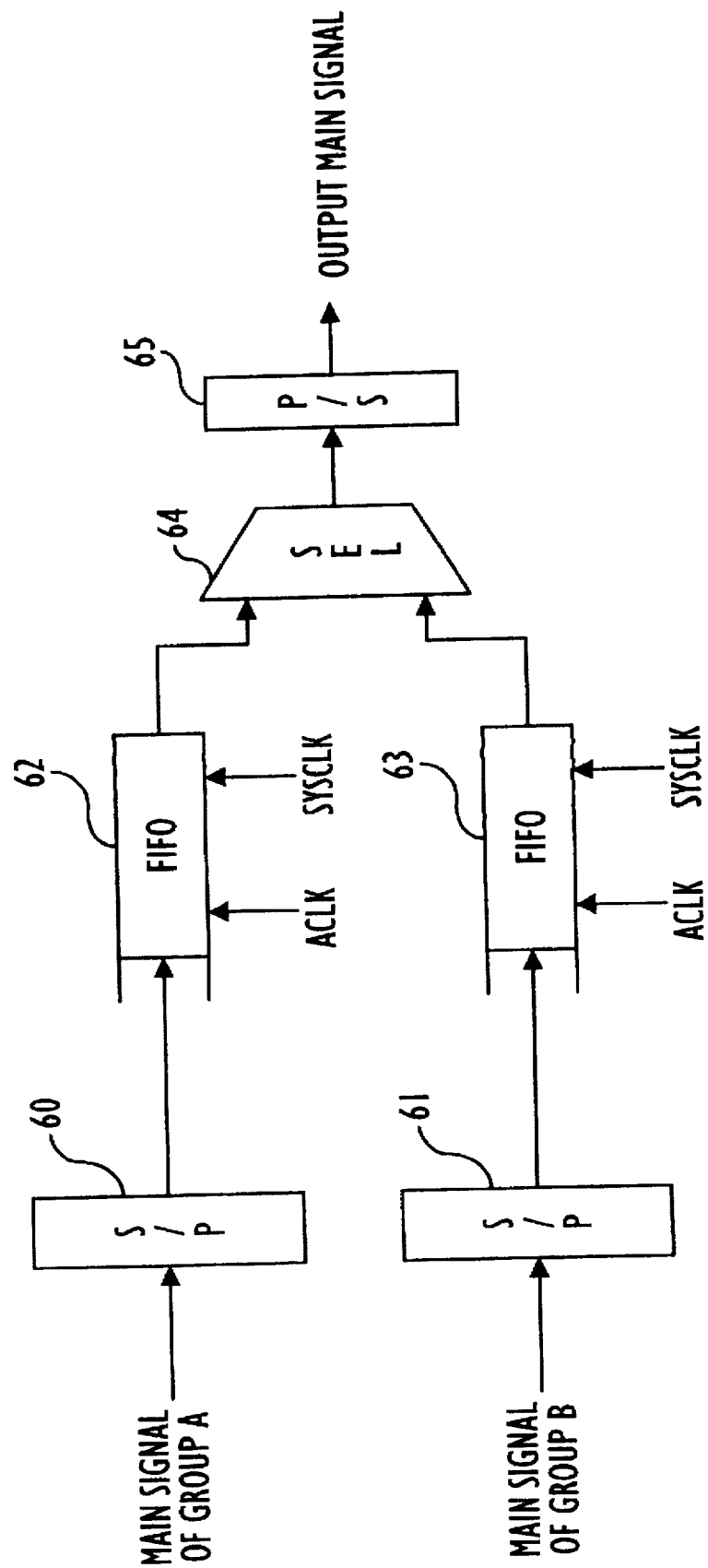
FIG. 6 is a block diagram of a structural example of a selector.

FIG. 6 is a block diagram illustrating a structural example commonly employed for the selectors 45, 46, 103, 203 and 209 shown in FIGS. 4 and 5. The main signals in A (working) and B (protection) groups are respectively inputted to the serial/parallel convertors 60 and 61.

The outputs of the serial/parallel convertors 60 and 61 are inputted with a timing of the A clock (ACLK) to the FIFO memories 62 and 63, and are outputted with a timing of the system clock (SYSCLK). That is, the clock of signals is converted to the system clock.

The selector 64 selects the outputs of the serial/parallel 5 convertors 60 and 61. The serial/parallel convertor 65 converts the selected output of the selector 64 to a serial signal and outputs it as a selected main signal.

Figure 7:
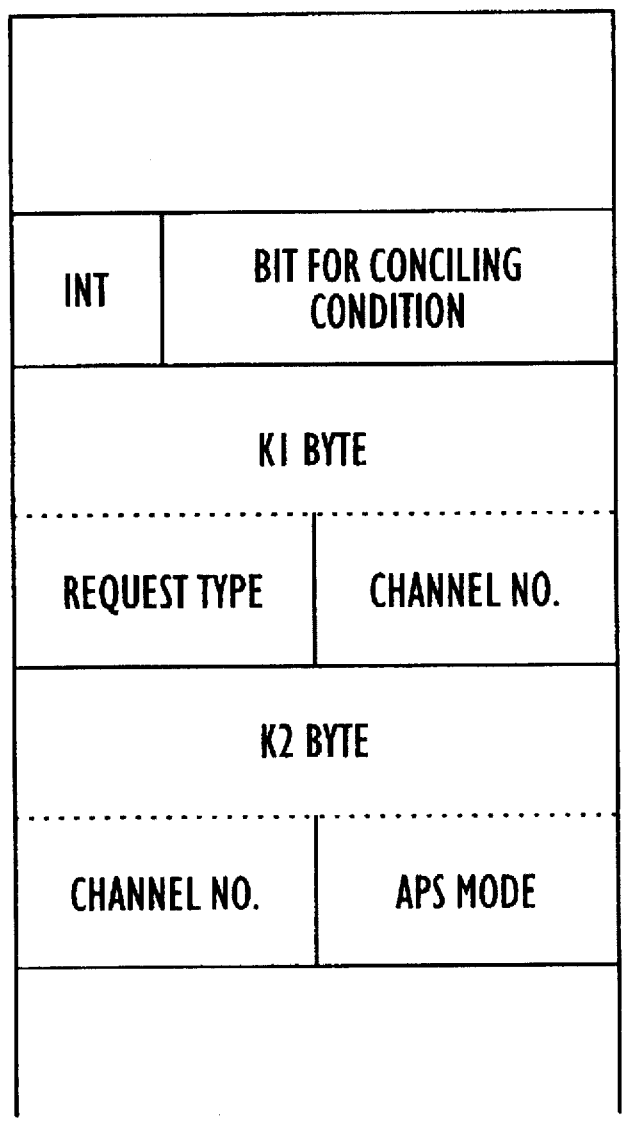
FIG. 7 is a diagram showing a format of a signal sent from the fiber interface common card to the fiber interface card.

Referring now to FIG. 7, an example of the control signal format according to the present invention is shown. Shown is a format transmitted between the internal control signal transmitter 102 in the individual section 14 shown in FIGS. 2 and 4 and the internal control signal transmitter 208 in the common section 11 shown in FIGS. 3 and 5.

FIG. 7 illustrates a format of the signal transmitted from the internal control signal transmitter 208 in the common section 11 to the internal control signal transmitter 102 in the individual section 141.

As shown in FIG. 7, the signal outputted from the internal control signal transmitter 208 in the common section 11 has an INT, which is a bit for reconciling the condition between the working and protection common sections 11. Further, in FIG. 7, the format includes K1/K2 bytes.

Figure 8:
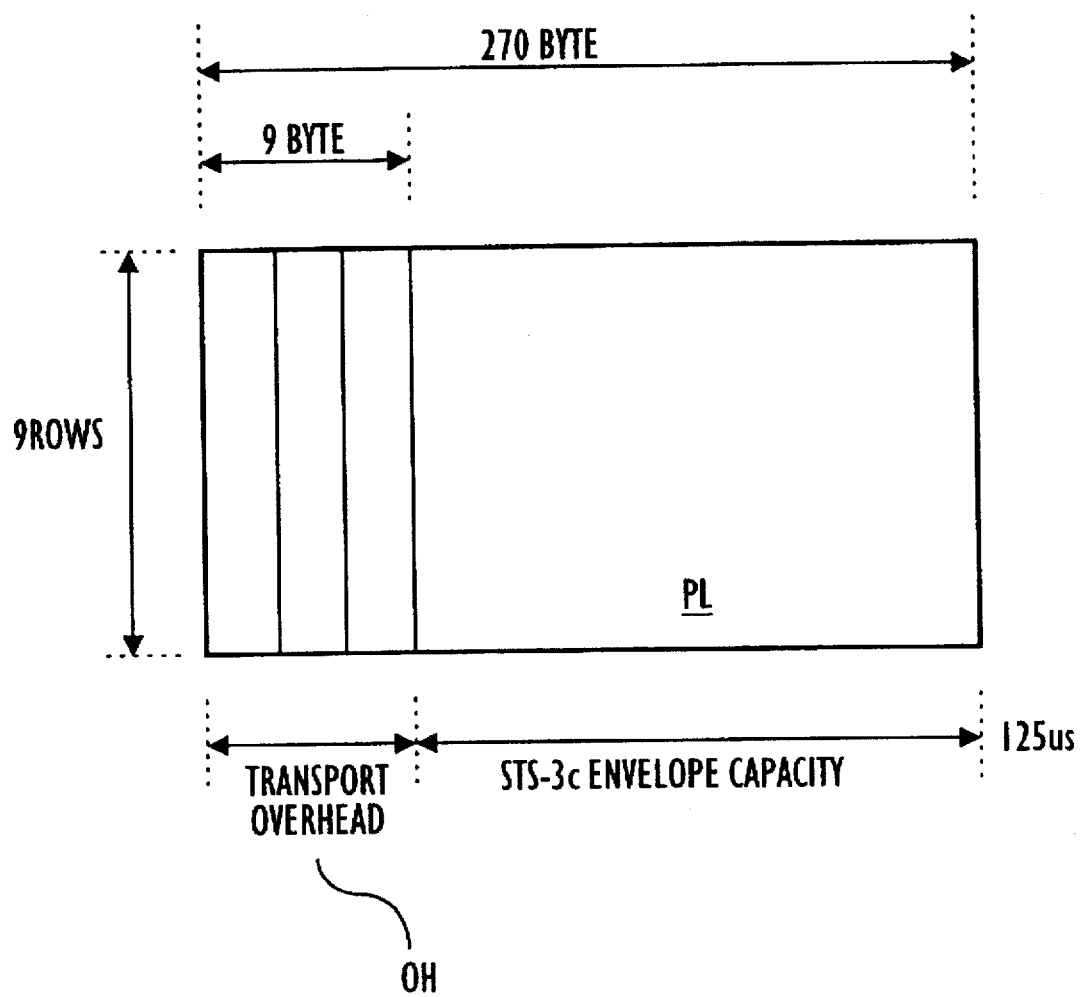
FIG. 8 is a diagram for explaining the position of K1/K2 bytes in the overhead.

A frame structure of the above-described main signal will be explained in accompanying with an example of SONET frame. FIG. 8 is a diagram for explaining an entire SONET frame structure, when a transmitting bit rate is 155.52M bits. The frame is formed with the size of 270 bytes×9 rows, and has an overhead section OH and a payload section PL. If the transmitting speed is 622.08M bits, an entire SONET frame structure has fourth as large as the size of the frame shown in FIG. 8, i.e., the size of 1080 bytes×9 rows.

Figure 9:
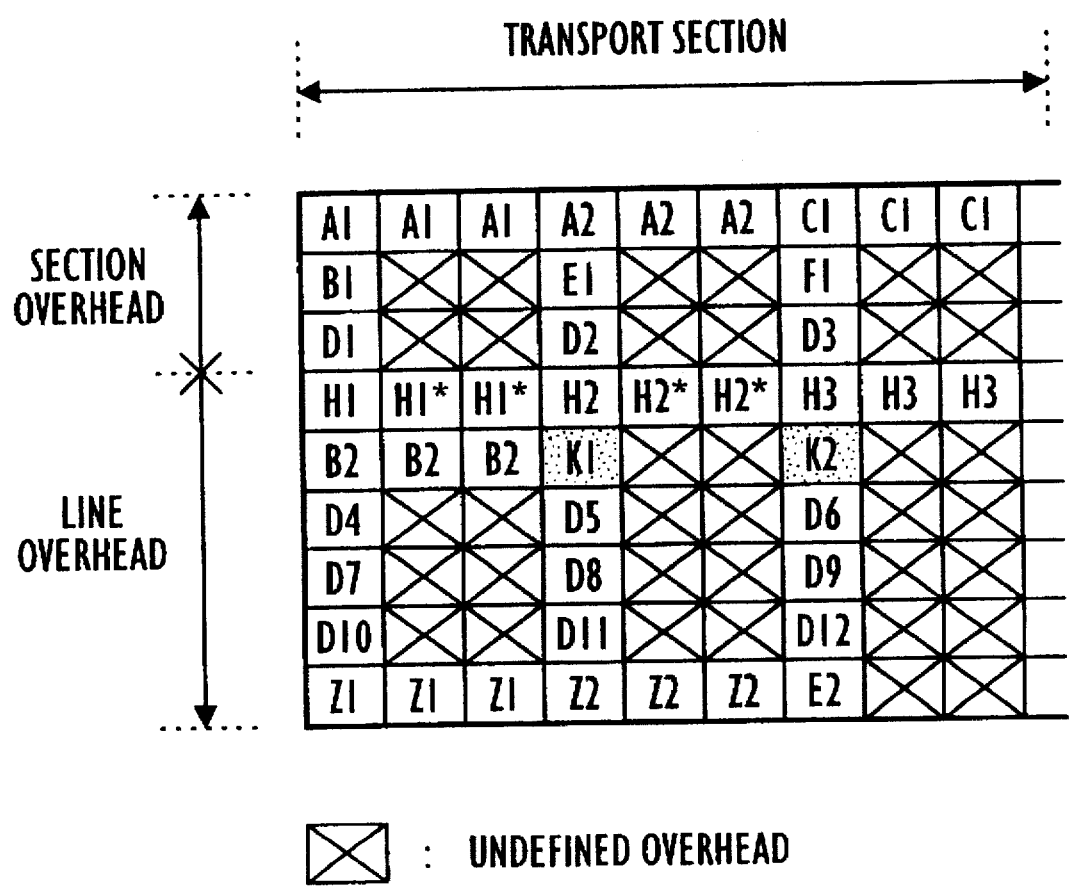
FIG. 9 is a diagram for explaining the position of K1/K2 bytes in the overhead.
Figure 11:
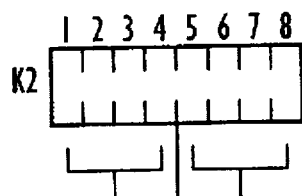
FIG. 11 is a diagram for explaining the definition of the K2 byte.
Figure 14:
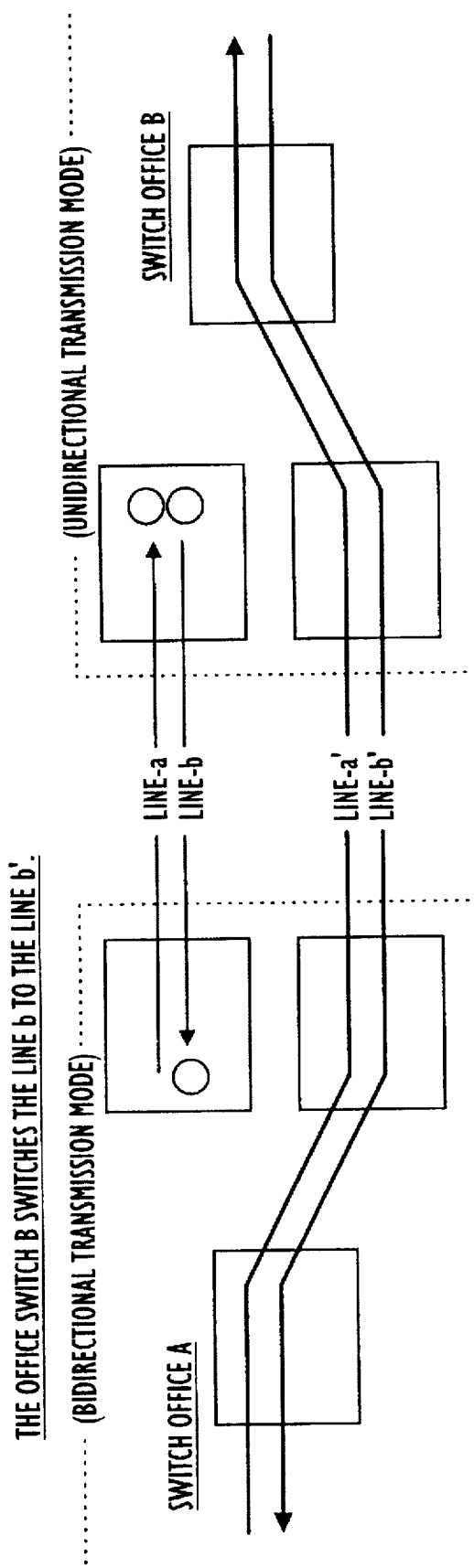
FIG. 14 shows a third embodiment of line switching with a 1:n structure.

The structure of overhead section OH is as shown in FIG. 9. K1/K2 bytes are positioned as shown in FIG. 9. Further, the definitions of contents of K1 and K2 bytes are as shown in FIGS. 10 and 11. As is apparent from FIGS. 10 and 11, K1 byte expresses the request type in the bits 1 to 4, and the use of lines or channels in the bits 5 to 8.

Meanwhile, the K2 byte expresses channel information in the bits 1 to 4, an APS architecture in the bit 5, and an information of operation in the bits 6 to 8, such as distinction of the unidirectional or bidirectional transmission.

A plurality of ATM cells are provided on the payload section PL. The control cells multiplexed in the multiplexers 46 (refer to FIG. 4) and 204 (refer to FIG. 5) are also on the payload section PL, besides the data cells transmitted between switches.

Concrete examples of line switching, which is performed according to the above-described structures of the present invention will be described as follows.

FIGS. 12A through 14 show an example of line switching with the 1:n structure. It is premised on the embodiment that the switch office A employs a bidirectional transmission mode, while the switch office B employs a unidirectional transmission mode, and the both office switches A and B are on the 1:n structure. Further, both directions employs working lines a and b as working lines.

Now, the case where a fault is generated in a point X on the line a will be considered (refer to FIG. 12A). Then, the switch office B, which is a receiving side, detects the fault. The switch office B switches the line a to a protection line a' according to the fault detection. The switch office B also notifies the switching of the receiving line to the switch office A. The notification is performed by the use of the K1/K2 bytes, described above (refer to FIG. 12B).

The switch office A that received the notification of switching sent from the switch office B, which is a receiving side, employs a bidirectional transmission mode. Therefore, it is required to switch the lines in both directions. Additionally, as it is also required that the line on the transmitting side of the switch office B is switched, the switch office A makes the line b, which does not have a fault, actually, look like a line having a fault, and notifies the fault of the line b to the switch office A. Then, the switch office A switches its own line (refer to FIG. 13A).

The switch office B, which received the fault notification, also switches the line on the transmitting side from b to b' (refer to FIG. 13B). As described above, the fault notification is also performed by the use of the K1/K2 bytes.

Accordingly, the switch office B, which received the fault notification, switches the line b, which is on the transmitting side, to the line b' (refer to FIG. 13B). Therefore, it is completed to switch the both lines to the protection lines.

Figure 15:
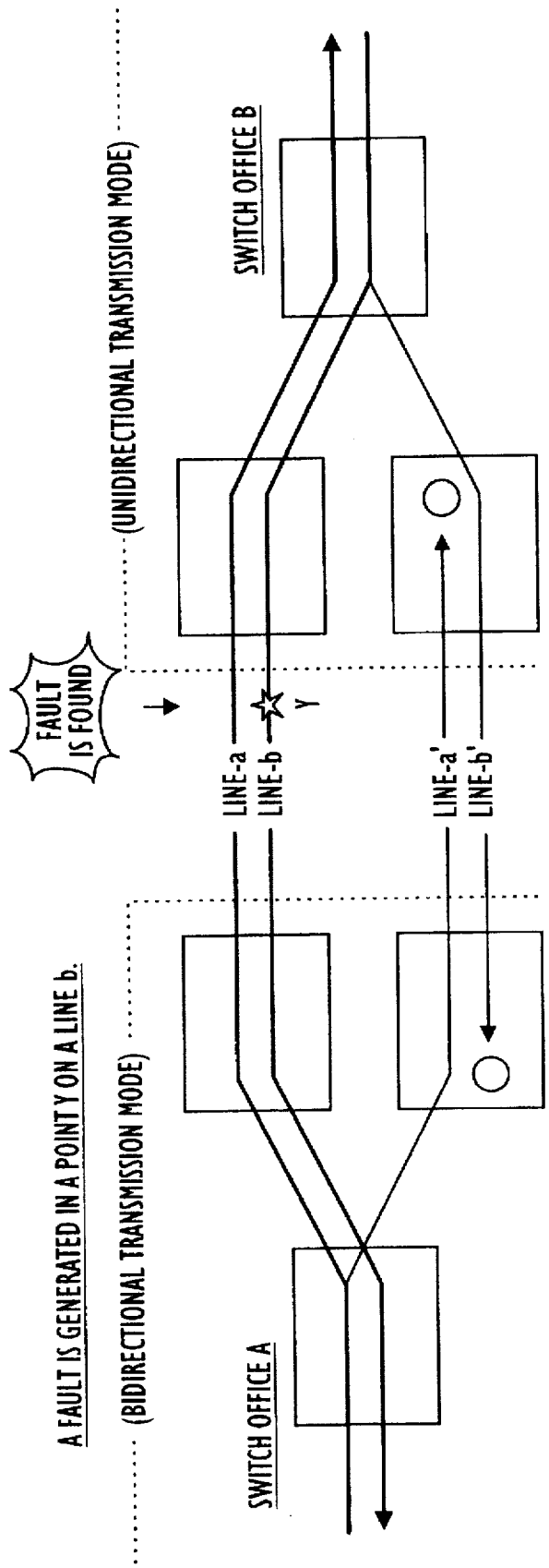
FIG. 15 illustrates a first embodiment of line switching with a 1+1 structure.
Figure 17:
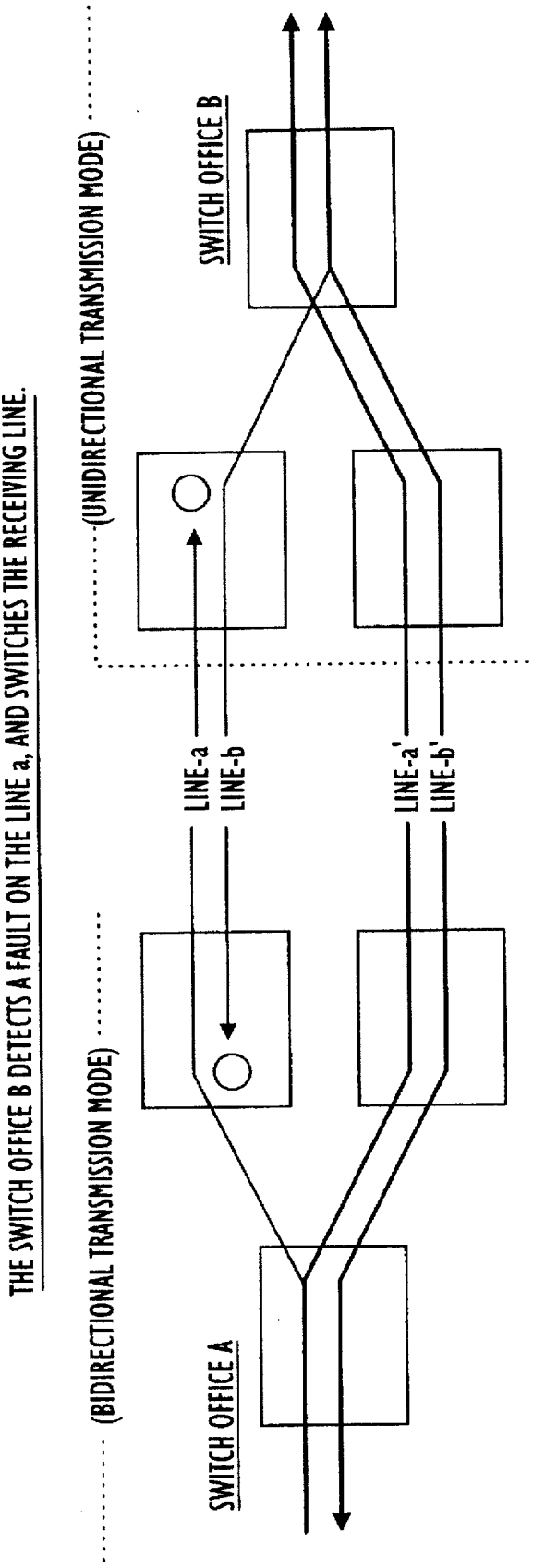
FIG. 17 illustrates a third embodiment of line switching with a 1+1 structure.
Figure 18:
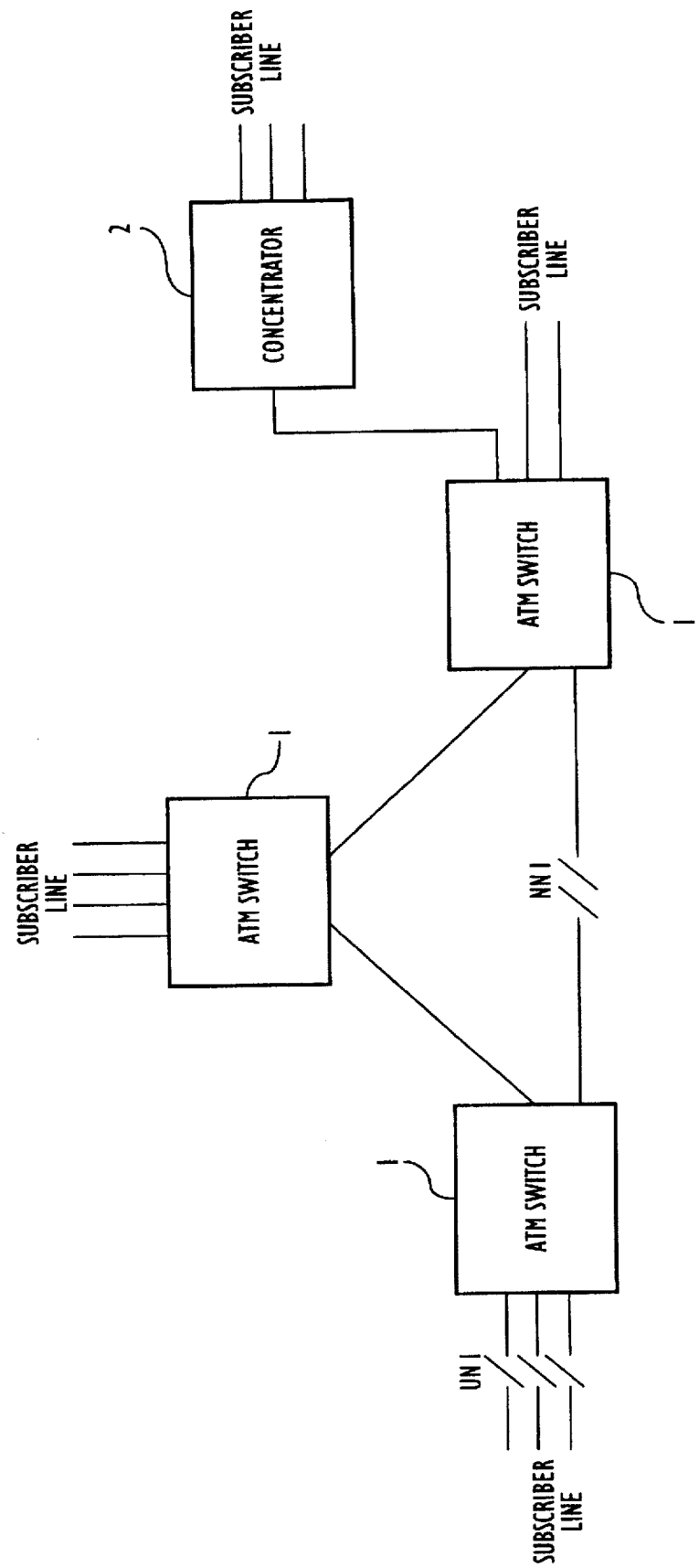
FIG. 18 is an explanatory diagram of a structural example of a B-ISDN system.
Figure 19:
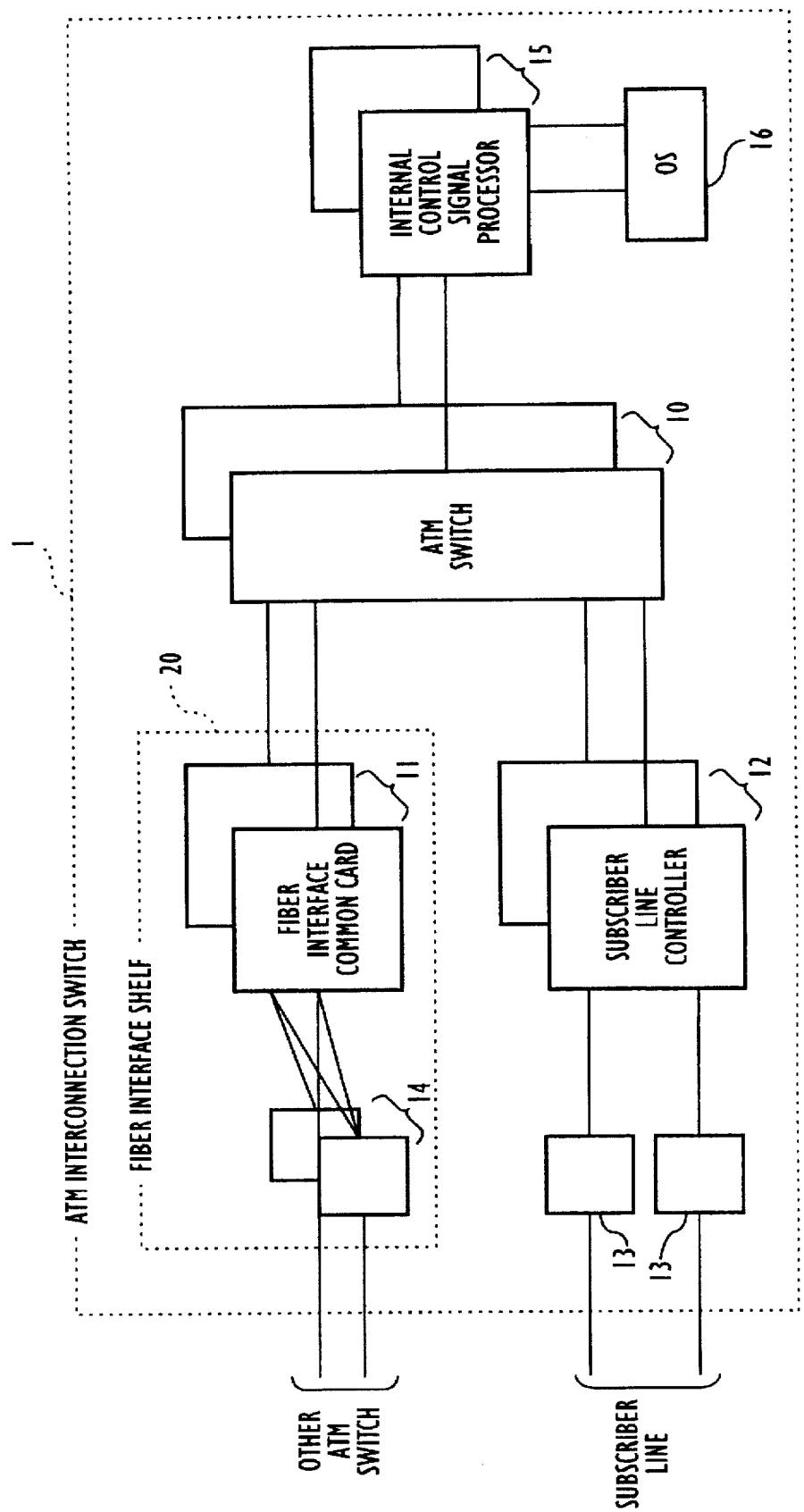
FIG. 19 is a principle diagram of an ATM switch.
Figure 20:
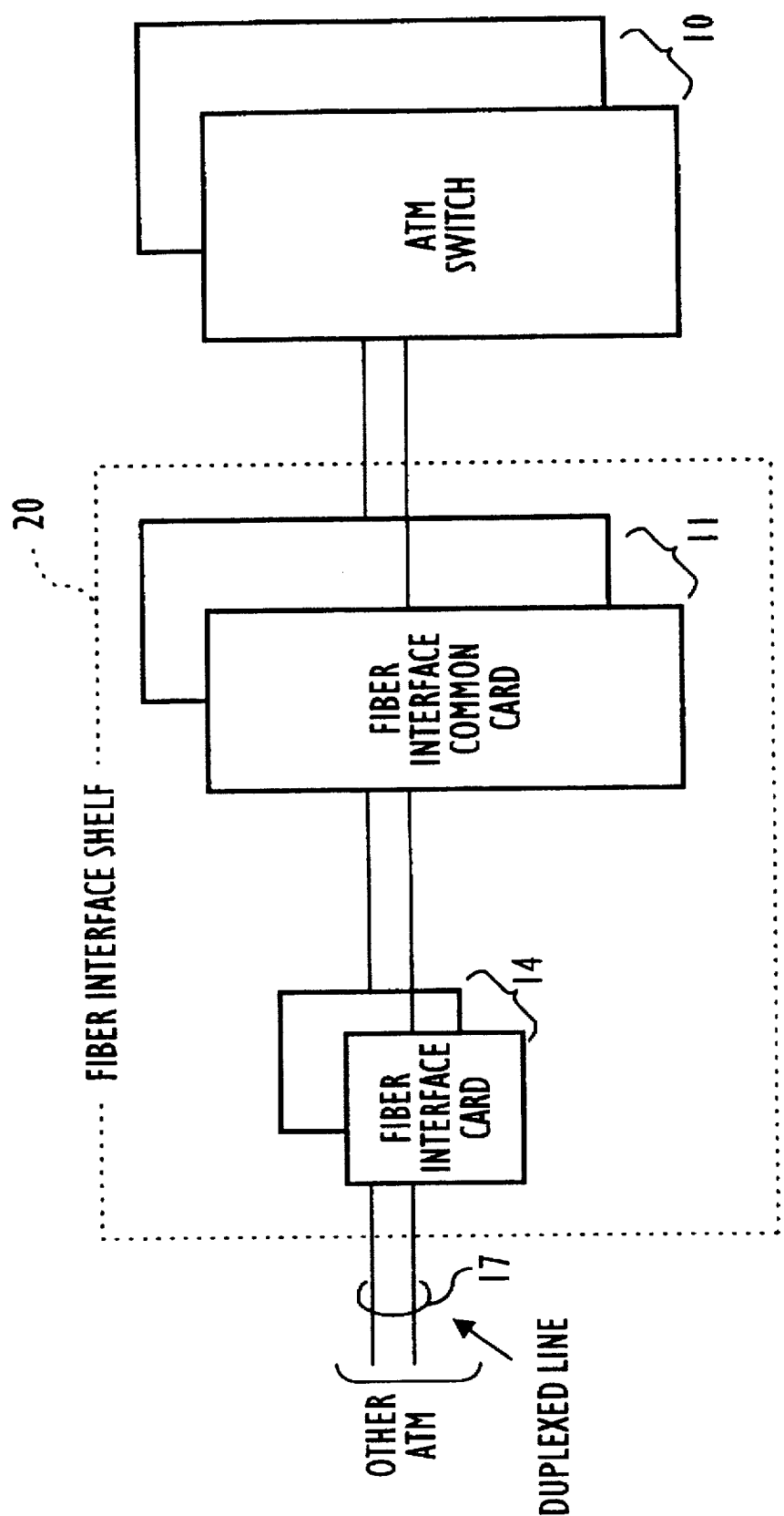
FIG. 20 is a diagram showing a structure of a fiber interface shelf.
Figure 21:
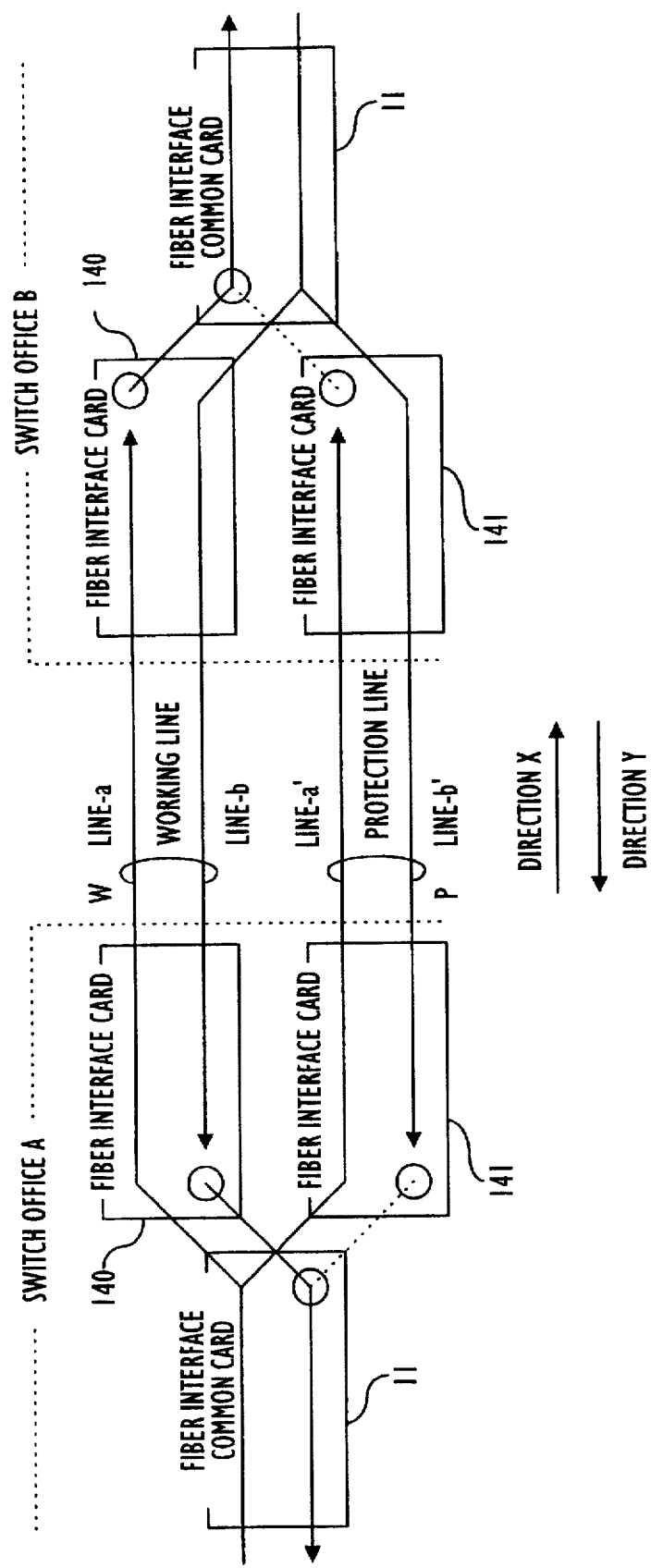
FIG. 21 is a diagram showing a structural example of connecting an ATM switch to other ATM switch.
Figure 22:
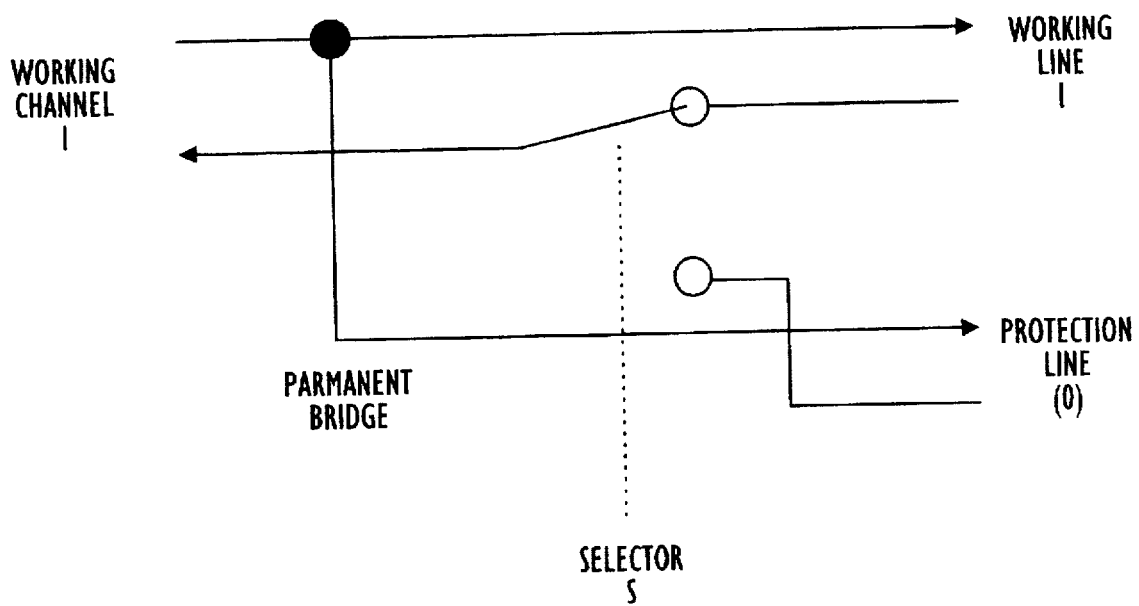
FIG. 22 is an explanatory diagram of line switching with a 1+1 structure.
Figure 23:
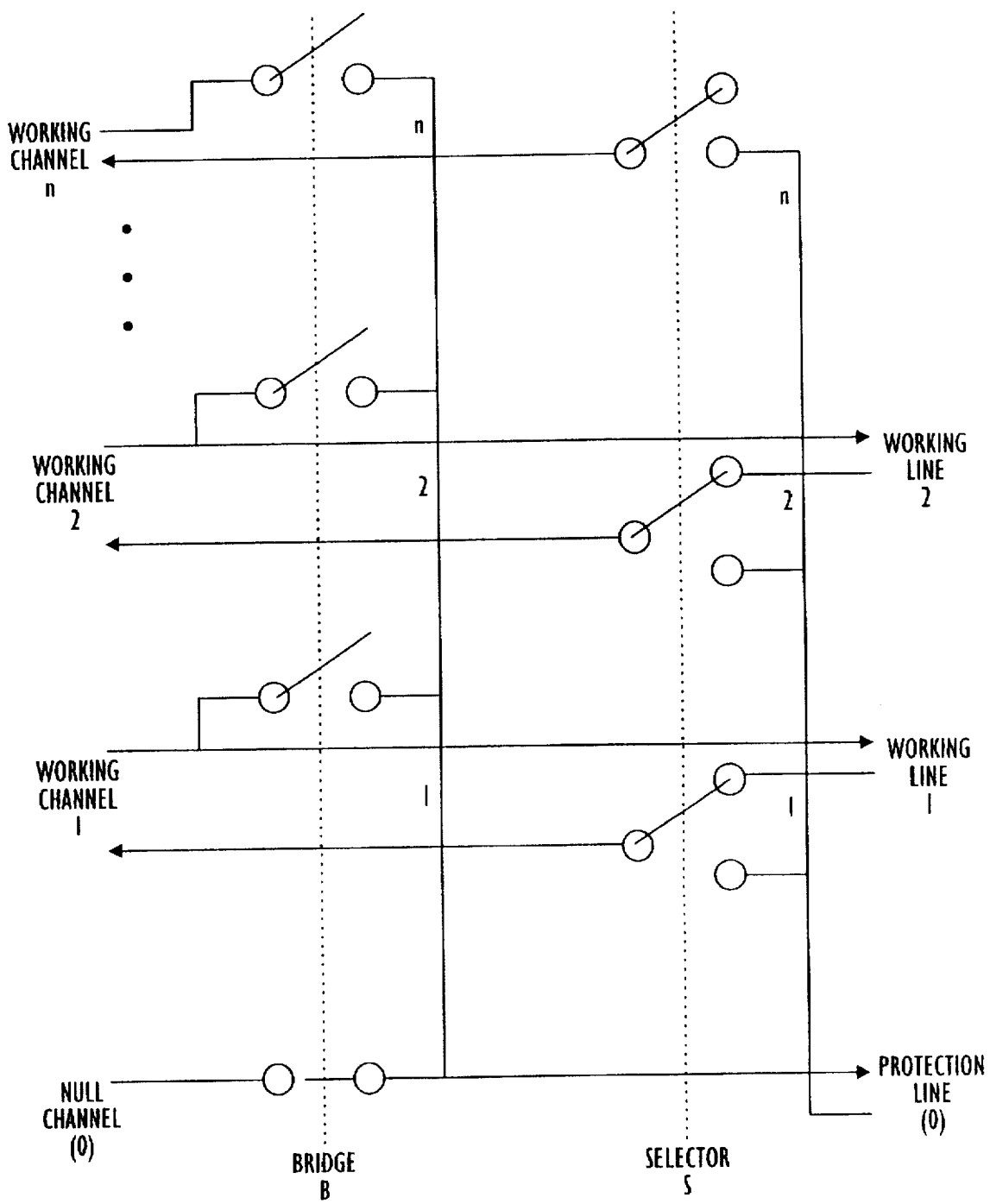
FIG. 23 is an explanatory diagram of line switching with a 1:n structure.
Figure 24:
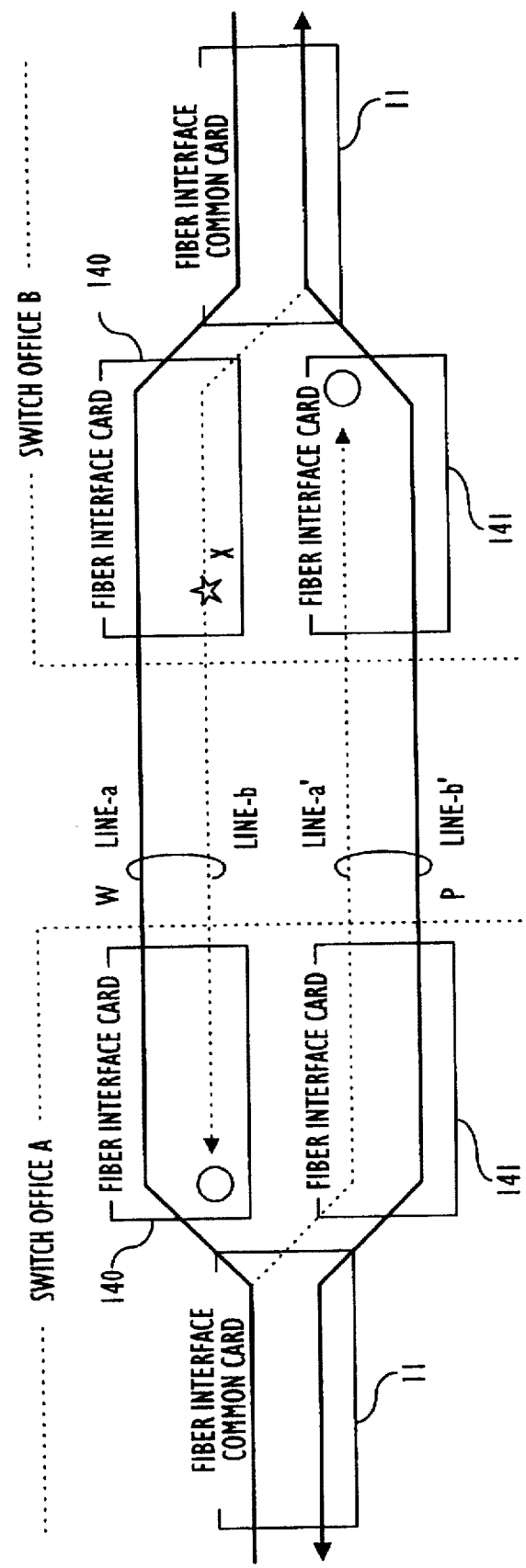
FIG. 24 is a diagram for explaining how to provide a bidirectional transmission mode.

FIGS. 15 through 17 show an example of line switching with the 1+1 structure. It is premised on the example that the switch office A employs a bidirectional transmission mode, while the switch office B employs a unidirectional transmission mode, and the both switch offices A and B are on the 1+n structure. Further, both directions employs lines a and b as working lines.

Now, the case where a fault is generated in a point Y on a line b will be considered (refer to FIG. 15). Then, the switch office A, which is a receiving side, detects the fault. The switch office A switches the line b to a protection line b' according to the fault detection. However, the switch office A employs a bidirectional transmission mode. Thus, it is required to switch the lines of the switch office B, which is a facing switch office.

The switch office A makes the line a, which does not have a fault, actually, look like a line having a fault (refer to FIG. 16A). Concurrently, the switch office A switches the receiving and transmitting line of the switch office A (refer to FIG. 16B). Further, the fault notification from the switch office A to the switch office B is performed by the use of the K1/K2 bytes, described above.

Additionally, the switch office B, which is the receiving side, switches the receiving line to the protection line b', when the switch office B received the fault notification sent from the switch office A (refer to FIG. 17). Consequently, the both lines are switched to the protection lines.

In the above-described embodiment, the fault notification is performed by the use of K1/K2 bytes in the SONET frame. However, the present invention is not restricted to this. It is possible to notify the fault by employing DCC (Data Communication Channel) interface, which is formed of D1 to D12 byte in the overhead section shown in FIG. 9, instead of the K1/K2 byte.

As above-explanation according to the embodiments, it becomes easy to switch lines on the bidirectional transmission mode, even if the facing station employs the unidirectional transmission mode, according to the present invention.

Although the present invention has been described with reference to embodiments, the present invention is not restricted to those. The scope of the present invention being indicated by the appended claims rather than by the foregoing description and all changes which come within the meaning and range of equivalency of the claims are therefore intended to be embraced therein.

What is claimed is:

1. A line switching system for switching transmission lines when a fault is found on a transmission line, comprising:

working and protection transmission lines, each including first and second direction paths;

a first switch coupled to one end of the working transmission line and having a bidirectional mode in which the first and second direction paths of the working transmission line are concurrently switched to the first and second direction paths of the protection transmission line when a fault is found on either one of the first and second direction paths of the working transmission line; and a second switch coupled to another end of the working transmission line and having a unidirectional mode in which either one of the first and second direction paths of the working transmission line is switched to the corresponding one of the first and second direction paths of the protection transmission line when a fault is found on one of the direction paths of the working transmission line, wherein when the second switch switches to send out signals via the first direction path of the protection transmission line, the first switch notifies the second switch as if a fault is found on the second direction path of the working transmission line so that the second switch switches to receive signals via the second direction path of the protection line.

2. The line switching system according to claim 1; wherein said first and second switches respectively notify said fault to each other by using an overhead bit of a transmission frame.

3. The line switching system according to claim 1; wherein said first and second switches respectively notify said fault to each other by using a data communication channel (DCC) presented in an overhead of a synchronous node optical network (SONET) frame.

4. The line switching system according to claim 1; wherein said working and protection transmission lines are formed as 1+1 structure.

5. The line switching system according to claim 1; wherein said working and protection transmission lines are formed as 1:n structure.

6. The line switching system according to claim 1; wherein each of said first and second switches is an asynchronous transfer mode (ATM) switch.

7. The line switching system according to claim 6; wherein said asynchronous transfer mode (ATM) switch includes, duplexed ATM switches, each for switching transmission paths of ATM cells, and a fiber interface shelf connected between the duplexed ATM switches and the working and protection transmission lines for controlling line switching from the working transmission line to the protection transmission line when a failure is detected on the working transmission line without any control under an Operation System software.

8. A line switching system for switching transmission lines when a fault is found on a transmission line, comprising:

working and protection transmission lines, each including first and second direction paths;

a first switch coupled to one end of the working transmission line and having a bidirectional mode in which the first and second direction paths of the working transmission line are concurrently switched to the first and second direction paths of the protection transmission line when a fault is found on either one of the first and second direction paths of the working transmission line; and a second switch coupled to another end of the working transmission line and having a unidirectional mode in which either one of the first and second direction paths of the working transmission line is switched to the corresponding one of the first and second direction paths of the protection transmission line when a fault is found on one of the first and second direction paths of the working transmission line, wherein the second switch notifies the first switch that a fault is found on the first direction path of the working transmission line and also switches to receive signals via the first direction path of the protection transmission line, and the first switch notifies the second switch as if a fault is found on the second direction path of the working transmission line so that the second switch switches to send out signals via the second direction path of the protection transmission line.

9. A line switching system for switching transmission lines when a fault is found on a transmission line, comprising:

working and protection transmission lines, each including first and second direction paths;

a first switch coupled to one end of the working transmission line and having a bidirectional mode in which the first and second direction paths of the working transmission line are concurrently switched to the first and second direction paths of the protection transmission line; and a second switch coupled to another end of the working transmission line and having a unidirectional mode in which either one of the first and second direction paths of the working transmission line is switched to the corresponding one of the first and second direction paths of the protection transmission line when a fault is found on one of the first and second direction paths of the working transmission line, wherein when the first switch detects that a fault is found on the second direction path of the working transmission line, the first switch concurrently switches to send and receive signals via the first direction path and the second direction path of the protection transmission line, and the first switch notifies the second switch of the fault detected on the second direction path of the working transmission line and also notifies the second switch as if a fault is found on the first direction path of the working transmission line so that the second switch separately switches to send out and receive signals via the first direction path and the second direction path of the protection transmission line.

10. A line switching method for switching a working transmission line to a protection transmission line, each of the working and protection transmission lines including first and second direction paths connecting a first switch having a bidirectional mode in which the first and second direction paths of the working transmission line are concurrently switched to the first and second direction paths of the protection transmission line when a fault is found on either one of the first and second direction paths of the working transmission line, and a second switch having a unidirectional mode in which either one of the first and the second direction paths of the working transmission line is switched to the corresponding one of the first and second direction paths of the protection transmission line when a fault is found on one of the first and second direction paths of the working transmission line, the method comprising the steps of:

detecting by the second switch a fault on the first direction path of the working transmission line;

switching by the second switch to send out signals via the first direction path of the protection transmission line;

notifying by the first switch to the second switch as if a fault is found on the second direction path of the working transmission line; and switching by the second switch to receive signals via the second direction path of the protection line.

11. The line switching method according to claim 10, wherein in the step of notifying, the first and second switches respectively notify the detected fault to each other by using an overhead bit of a transmission frame.

12. The line switching method according to claim 10, wherein in the step of notifying, the first and second switches respectively notify the detected fault to each other by using a data channel (DCC) presented in an overhead of a synchronous node optical network (SONET) frame.

13. The line switching method according to claim 10, wherein said working and protection transmission lines are formed as 1+1 structure.

14. The line switching system according to claim 10, wherein said working and protection transmission lines are formed as 1:n structure.

15. The line switching system according to claim 10; wherein each of said first and second switches is an asynchronous transfer mode (ATM) switch.

* * * * *